US006757372B1

United States Patent
Dunlap et al.

(10) Patent No.: US 6,757,372 B1
(45) Date of Patent: Jun. 29, 2004

(54) USER INTERFACE FOR A NETWORK-ENABLED TELEPHONE

(75) Inventors: Richard Allen Dunlap, Euless, TX (US); Erich Ian Domingo, Hayward, CA (US); Peter James Coughlan, Palo Alto, CA (US); Steven Vassallo, Palo Alto, CA (US); Daniel James Stillion, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/481,011

(22) Filed: Jan. 10, 2000

(51) Int. Cl.[7] .......................... H04M 1/56; H04M 15/06
(52) U.S. Cl. ......................... 379/142.17; 379/142.01; 379/142.04; 455/566
(58) Field of Search .............................. 379/88.2, 88.21, 379/93.23, 142.01–142.18, 127.01; 455/403, 415–416, 463, 554–555, 566–567, 575

(56) References Cited

U.S. PATENT DOCUMENTS 5,815,080 A * 9/1998 Taguchi
6,049,796 A * 4/2000 Siitonen et al.
6,169,734 B1 * 1/2001 Wilson
6,240,168 B1 * 5/2001 Stanford et al.
6,327,477 B1 * 12/2001 Hachimura et al.

OTHER PUBLICATIONS

Nokia Model 9000i User's Manual, copyrighted 1995–1997, all pages.*

* cited by examiner

*Primary Examiner*—Duc Nguyen
(74) *Attorney, Agent, or Firm*—Beyer Weaver & Thomas, LLP

(57) ABSTRACT

An interactive user interface displayed on a monitor as part of a telephone is disclosed. The interactive user interface allows a user to easily use basic and advanced telephony functions, telephony-related services, such as accessing phone directories and voice mail, and non-telephony services. These non-telephony services can include any information deliverable over, for example, TCP/IP or DHCP, and can include information such as stock prices, weather, sports data, and so on, typically from third-party services. It can also include intra-company information such as meeting schedules, conference room bookings, cafeteria menus, and so on. A user can also pull up context-sensitive "help" information on the display at any time to learn more about a particular mode, option, or feature.

34 Claims, 32 Drawing Sheets

| 12:50p | 12/12 | (650) 778-8125 |
|---|---|---|
| | Franklin Elega... | 778-8125 |
| | 202 | 778-8127 204 |
| | | 778-8129 |
| | 201 | 778-8191 |
| | | 778-8193 |
| | | 778-8195 |

📖 Search Directories

First Name:
Last Name:
   Number:
    Other:

Enter fields with dial pad

| <<< | >>> | Begin | Cancel |

FIG. 4B

| 12:50p 12/12 (650) 778-8125 |
|---|
| 📖 Business |
| ⋮⋮ Atypical Networks
1.616.555.9211 |
| ⋮⋮ Eclipse Productions
1.800.337.5000 |
| ⋮⋮ Eleganza, Franklin |
| Your current options |
| Copy | Paste | more |

☑ Ring Type
☑ High
☐ Low
☐ Warble

Your current options

| Select | Done |

*FIG. 7C*

USER INTERFACE FOR A NETWORK-ENABLED TELEPHONE

BACKGROUND OF THE INVENTION

1. Field of the Invention

The present invention relates generally to the field of telephone design and functionality. More specifically, it relates to user interfaces for telephones with voice-over-IP capability and telephony related services.

2. Discussion of Related Art

Many phones used today follow a key/lamp pair paradigm that offers users with literally hundreds of options and features. The key/lamp pair is a button on a phone and a corresponding LED light or lamp. This combination of button and LED lamp can be found on most PBX type phones used in offices and in various other environments outside the typical residential home. Typically, many phones today have at least 10 to 15 key/lamp pairs, some with many more, an information display area, also having corresponding keys for choosing menu items in the display area, and a variety of other buttons and controls. In short, most phones used in business or other non-residential settings are too complicated and the procedures for using them non-intuitive for many users. Although such phones offer users with many sophisticated and useful features, most users know how to use four or five of these features without having to look in a user's guide which, as a practical matter, is generally not done. Another problem stemming from the key/lamp pair paradigm is labeling the various keys with the name of the function, option, or speed-dial number. Despite the sophistication of today's phone, much of the labeling is done by printing or handwriting small labels and taping or adhering them next to the appropriate button. When the function or label of a particular button changes, a new label needs to be made to replace the old one. This manual process alone is a sufficiently high hurdle to keep many people from fully utilizing their phones.

In addition to being overly complex and cluttered with options and features most people rarely use, even the better designed phones provide little information on how to navigate through calls and other features such as messaging and voice mail. For example, most phones still rely on a blinking light to indicate messages or that a call is on hold or a red light to indicate that the "Set Busy" feature is activated. The user interface and display features are not commensurate with the sophistication and complexity of many phones today. As a result, users are not instructed on how to navigate and utilize many of the features via a simple and intuitive user interface. Most interfaces on phones today are limited to small liquid crystal display areas and numerous buttons and corresponding lamps. With such interfaces, for example, it is difficult to provide quick access to frequently used features—an important characteristic of any user interface. Furthermore, given the shortcomings of many user interfaces on phones today, it is unlikely they can provide non-telephonic information to a user. Presently, phones are under utilized in that they are capable of providing in-depth data on messaging, phone directories, and third-party data.

Therefore, it would be desirable to have a highly functional phone with a graphical display area capable of showing a rich depth of information on a screen for the user to see at any given time. It would be desirable to have a user interface in which buttons and keys are context-sensitive thereby reducing the number of mostly unused buttons on the phone. It would also be desirable to have a user interface familiar to users such as a window or segment-oriented interface for presenting information in an easily comprehensible and intuitive manner. It would also be desirable to give users on-demand access to context-sensitive "Help" information on functions and options available on the phone at anytime, thereby enabling users to take advantage of features and functions on the phone.

SUMMARY OF THE INVENTION

According to the present invention, an interactive user interface displayed on a monitor as part of a telephone is disclosed. The interactive user interface allows a user to easily use basic and advanced telephony functions, telephony-related services, such as accessing phone directories and voice mail, and non-telephony services. These non-telephony services can include any information deliverable over, for example, TCP/IP or DHCP, and can include information such as stock prices, weather, sports data, and so on, typically from third-party services. It can also include intra-company information such as meeting schedules, conference room bookings, cafeteria menus, and so on. The interactive user interface allows a user to intuitively and efficiently navigate through all telephonic and non-telephonic services using menus and scroll bars. A user can also pull up context-sensitive "help" information on the display at any time to learn more about a particular mode, option, or feature.

In one aspect of the present invention, a telephone having an interactive user interface displayed on a monitor connected to the telephone is described. The user interface presents one of numerous modes of use on the telephone. The user interface has several planes, segments, or frames including a header plane, a lines plane, a command selection plane, and a status plane. Although the term plane is used in the described embodiment, the term refers to any type of portion, frame, area, or segment on the screen that contains information viewable by a user. These planes or screen portions are generally non-overlapping and segment the display area in a way that allows the user to easily locate data items such as a menu option, status of the phone, time/date, phone numbers, and so on. The header segment displays basic information about the telephone such as a primary directory number assigned to the phone and time/date information. The lines segment displays context-sensitive data where the data, such an available line or a name from a phone directory, corresponds to a set of line keys or buttons on the telephone which the user can press. The command selection segment displays data on options, features, and other selections a user can make. These options and selections are context-sensitive and correspond to a set of soft keys on the telephone which the user can press to make a selection. The options and features available to the user can change depending on where the user is. Thus, the text above each soft key describing the option can change. The status segment displays data relating to either the options displayed in the command selection segment, as described above, or to the context-sensitive data in the lines segments. Generally, it communicates to the user, indirectly or directly, the status of the phone. Such an interactive user interface for use with a telephone facilitates navigating through numerous modes and services, each having various options, available through the telephone.

In another aspect of the invention, a telephone having context-sensitive information capabilities and a display monitor is described. The display monitor displays an interactive user interface for accessing telephony functions as well as non-telephony information. The user interface displays context-specific and descriptive information in text form (e.g., close to complete sentences) relating to a feature or option available through the telephone. The help information is displayed when the information button is pressed which can be done at any time or in any context.

In another aspect of the present invention, a telephone having a TCP/IP connection and a display monitor is described. The user interface is capable of displaying a network configuration menu in which information relating to the TCP/IP connection can be displayed and through which a user can adjust network parameters relating to the telephone. The network configuration information can also include displaying information related to a DHCP connection to the telephone which allows the user to adjust DHCP network parameters. In another aspect of the invention, a telephone having a display monitor capable of displaying non-telephony information is described. The non-telephony information can be retrieved from external sources such as the Internet or third-party information providers or be internal to the company implementing the telephone system. Such information can include stock market information, weather information, sports data, and other types of data that can be usefully displayed on the display monitor.

In one embodiment of the present invention, the lines segment contains numerous call segments where each one of the call segments displays data related to a call. In another embodiment, the different modes of the telephone accessible through the user interface includes directories, messages, settings, services, and information. In another embodiment, the directories mode includes a search segment in which a search can be performed using certain criteria and categories.

BRIEF DESCRIPTION OF THE DRAWINGS

The invention will be better understood by reference to the following description taken in conjunction with the accompanying drawings in which:

FIG. 2 is a screen shot of an overview state in accordance with one embodiment of the present invention.

FIGS. 4A to 4F are screen shots of Directories windows configuration of the present invention.

FIGS. 7A to 7I are screen shots of Settings window configurations of the present invention.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In accordance with one embodiment of the-present invention, there is provided a voice-over-IP network phone having an overlapping segment/window type user interface as described in the various figures. The user interface of the phone of the present invention strikes a balance between traditional PBX phones and new information delivery and management capabilities afforded by voice-over-IP technology. Information regarding call line management, directories, messaging, phone settings, and third-party information services is effectively displayed in a windows-oriented display area. Features available on the phone are accessible by soft keys or hard keys based on frequency of use and the immediacy in which they are typically accessed. Given the IP nature of the information delivery to such phones, third-party software developers have incentive for developing software for delivering information to such phones. In addition, with context-sensitive soft keys, it is possible to provide context-specific guidance and information for a particular feature. Before describing the object-based implementation of the phone features and modes, the interactive user display and physical key layout is described.

Figure 1A:
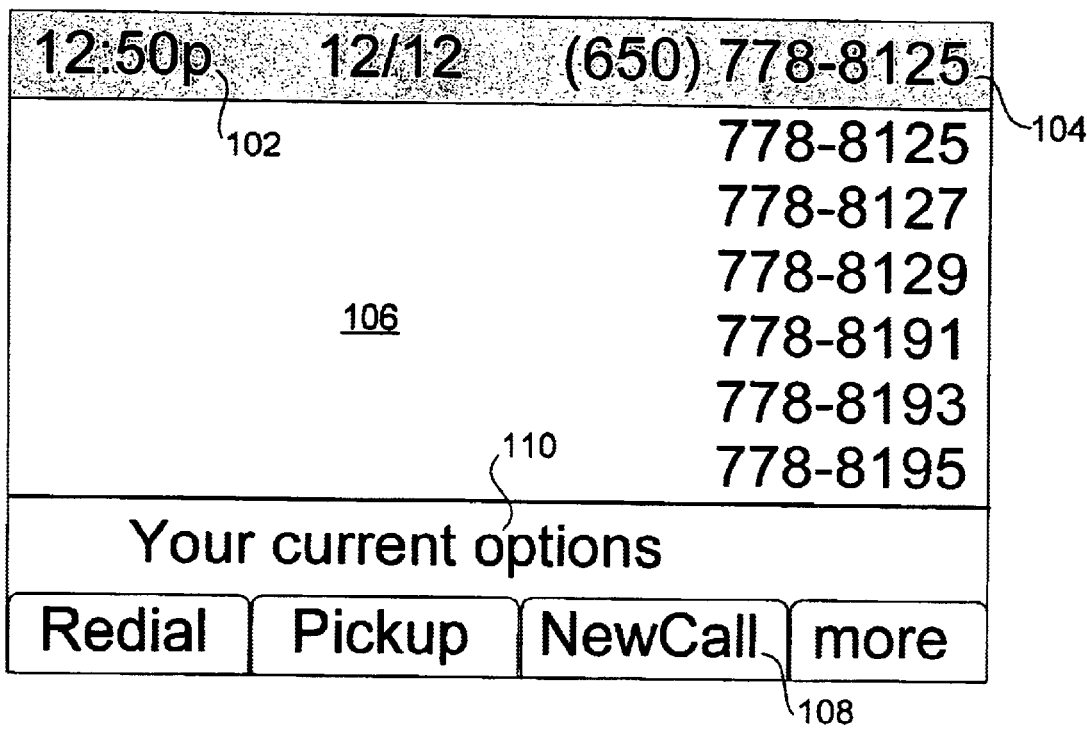
FIG. 1A is a screen shot of an overview window of the present invention.

The interactive design user interface of the present invention presents one of several modes of use to a user at any given time. These modes include, but are not limited to, Overview, Directories, Messages, Services, and Settings. The default mode or state is Overview. The initial screen configuration is the first screen shot of the user interface a user normally sees when using a phone ("set") equipped with the present invention. In the described embodiment, in the idle state users have visual access to each of the directory numbers or lines assigned to their set. When a call comes in to any one of these lines, a call plane or window, described in greater detail below, occupies a large portion of the screen, leaving only the last four digits of the directory number visible. As will be described further below, the user interface of the present invention has several planes, segments, or frames including, such as the call plane and a header plane. Although the term plane is used in the described embodiment, the term refers to any type of portion, area, or segment on the screen that contains information viewable by a user. An example of the overview screen shot is shown in FIG. 1A. At the top of the screen is a header plane/bar 102 that includes information such as time, date, and the primary directory number of the set. To the right of the primary number is a space 104 for an icon to denote the current state of the telephone line.

Figure 1B:
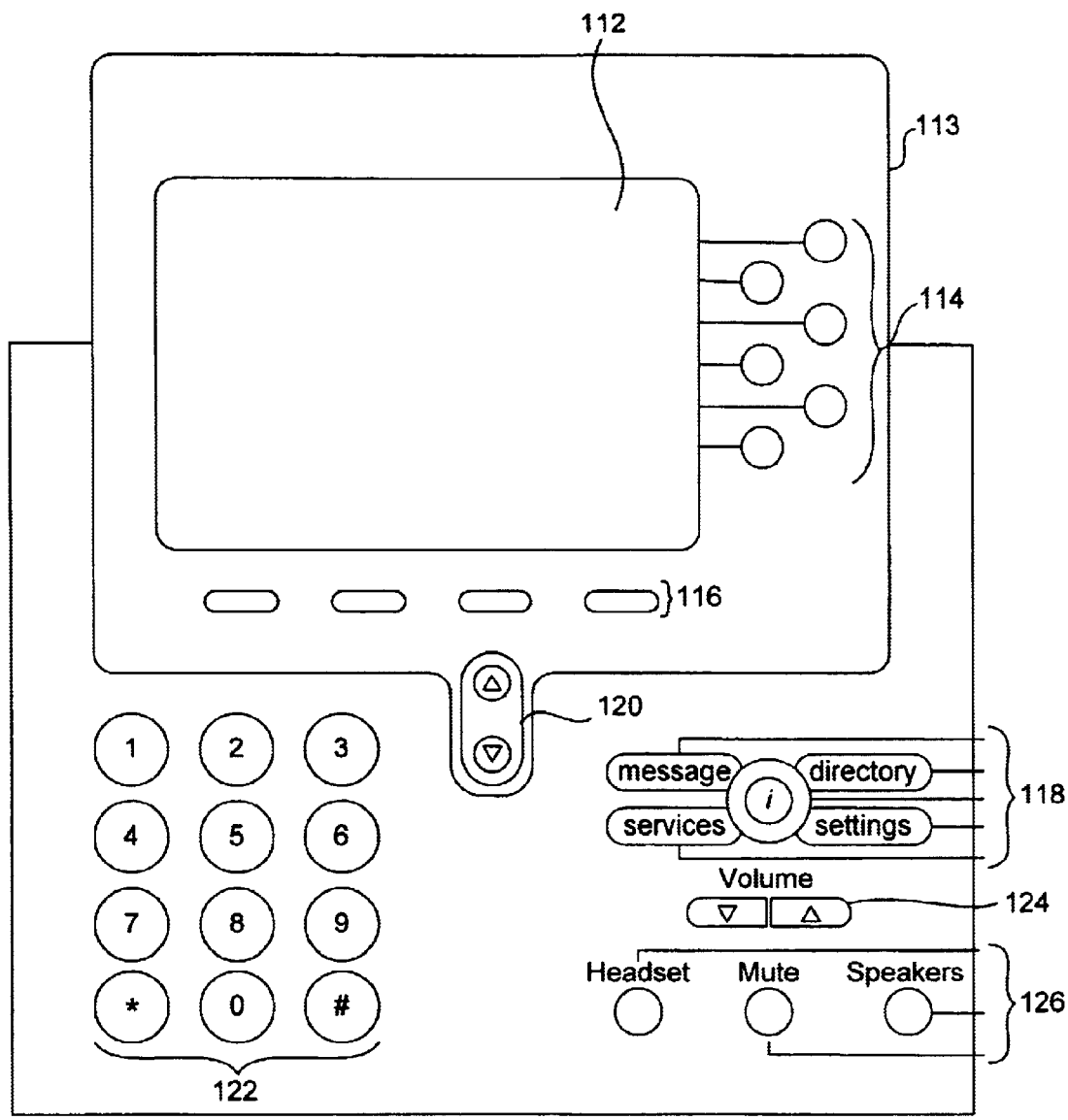
FIG. 1B is a photographic illustration of a phone equipped with a monitor and keys for using the interactive design user interface of the present invention.

In a line plane area 106 is a list of other direct lines available to the user. A particular line, including the primary direct line in header bar 102, can be selected by pressing a line key, described in FIG. 1B below, on the set that corresponds to (i.e., is physically across from) the line desired, such as 778–8191. At the bottom of the screen is a command selection area 108, also referred to as a soft key plane. In the described embodiment, there can be up to four commands in one menu. If more commands are desired, one command is reserved for "more," which when selected takes the user to another menu of commands. A command can be selected by pressing a corresponding "soft key" on the set directly below the command, as shown in FIG. 1B. In FIG. 1A there are three commands shown, two of which can be used in the overview state: Redial and NewCall, indicated by darker lettering compared to the grayed-out lettering of the presently inactive command PickUp. The screen portion directly above soft key plane 108 that contains the text "Your current options" is a status/prompt plane 110 that can have several roles in the described embodiment. In the overview mode, it prompts a statement relating to the soft keys. In other screen shots it can provide update information as to what the set is presently performing, such as dialing a number or searching for a name.

FIG. 1B is a photographic illustration of a phone equipped with a monitor and keys for using the interactive design user interface of the present invention. The user interface is displayed on a screen 112 on monitor 113. On the right side of screen 112 is a series of line keys or buttons 114 (each of which can be physically depressed) used to highlight or select a corresponding item, such as a number or name on screen 112. Each line key opens or closes a window or plane with information about a corresponding feature or item on screen 112, such as the name of the person being called. When applicable it can act as a speed dial key for a corresponding item (name or phone number) shown on screen 112.

Directly below screen 112 is a series of soft keys 116 used to activate corresponding commands or options shown on the screen in soft key plane 108. Soft keys are used to select an item from a menu (or a single selection) displayed in soft key plane 108. Also on the set is a group of keys 118 for activating some of the various other states or modes. They include buttons for Messages, Directory, Services, Settings, and Information ("i"). When pressed, a user can enter and exit a particular mode, as described in greater detail below. Also on the set are scrolling or "up/down" keys 120 for scrolling through pages on screen 112. The other keys are typical telephony keys including an alphanumeric key pad 122, volume buttons 124, and Headset, Mute, and Speaker buttons 126.

Figure 1C:
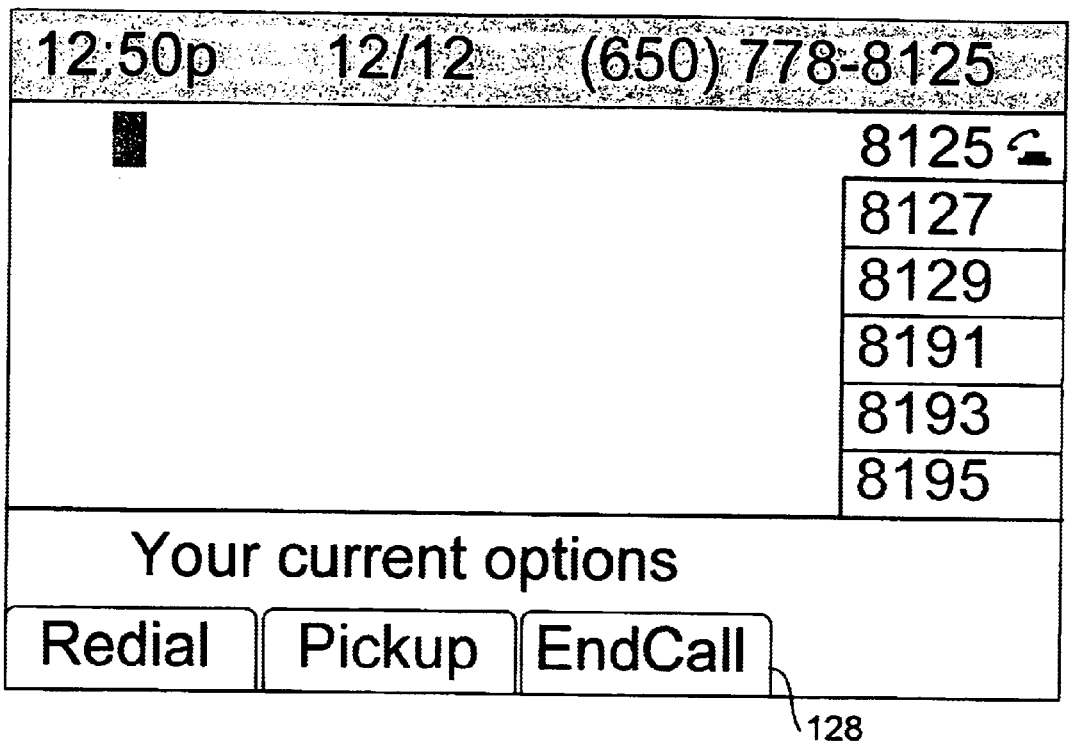
FIG. 1C is a screen shot showing a configuration of a call window of the present invention.
Figure 1D:
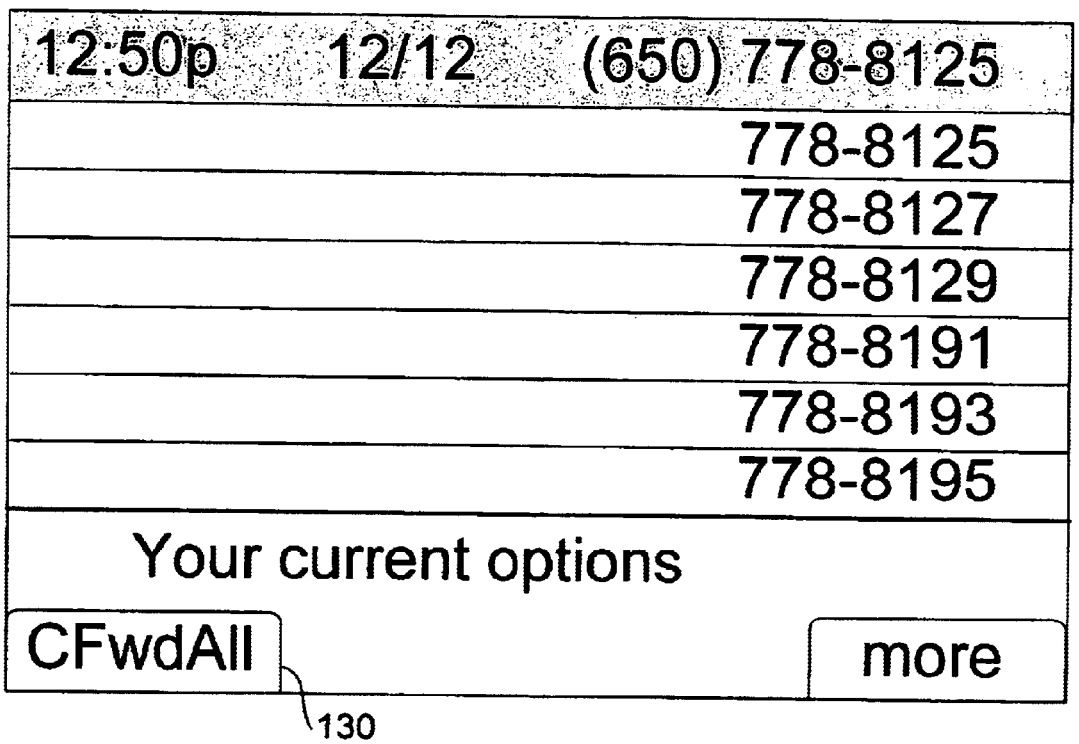
FIG. 1D is a screen shot showing another configuration of an overview state of the present invention.

Before describing the commands available from the overview state as shown in FIG. 1A, an overview window is described. FIG. 2 is a screen shot of an overview state in accordance with one embodiment of the present invention. In an overview window 201 line activity is signaled by minimal caller identification such as text string 202 and a line status icon 204 appearing to the right of the directory number. To get more detailed information on a call, a call window is invoked. An example of a call window is shown in FIG. 1C. FIG. 1C is a screen shot showing an example of a call window. Call window plane 129 is a call window for line 8125. A command EndCall 128 is available to the user in this configuration, as well as the Redial command. FIG. 1D is a screen shot showing another configuration of on overview state. A command CFwdAll 130 is available to the user in this configuration. In other preferred embodiments the other commands or options can be displayed in the various screen shots in the Idle state.

Figure 3A:
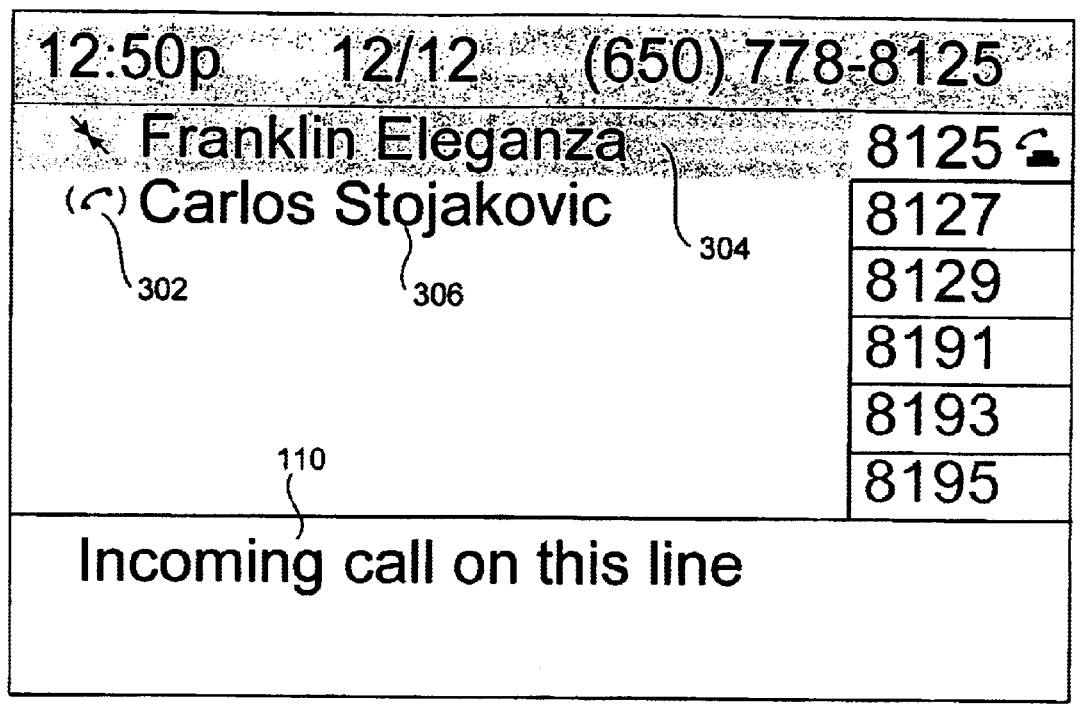
FIGS. 3A to 3C are screen shots of overview windows when an incoming call is received in the present invention.
Figure 3B:
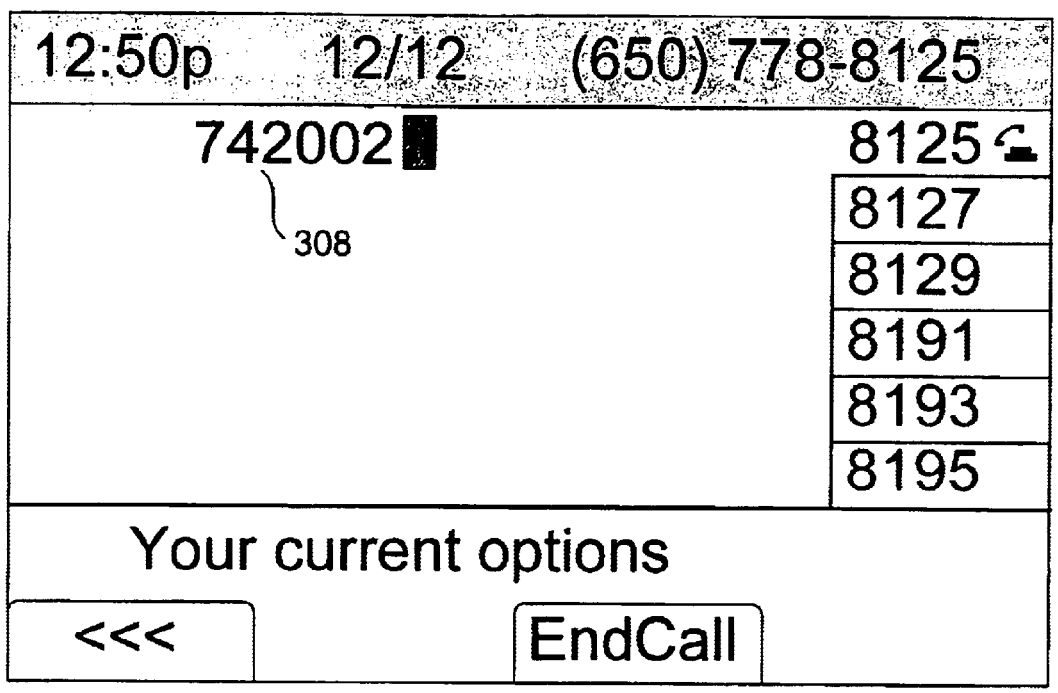
Figure 3C:
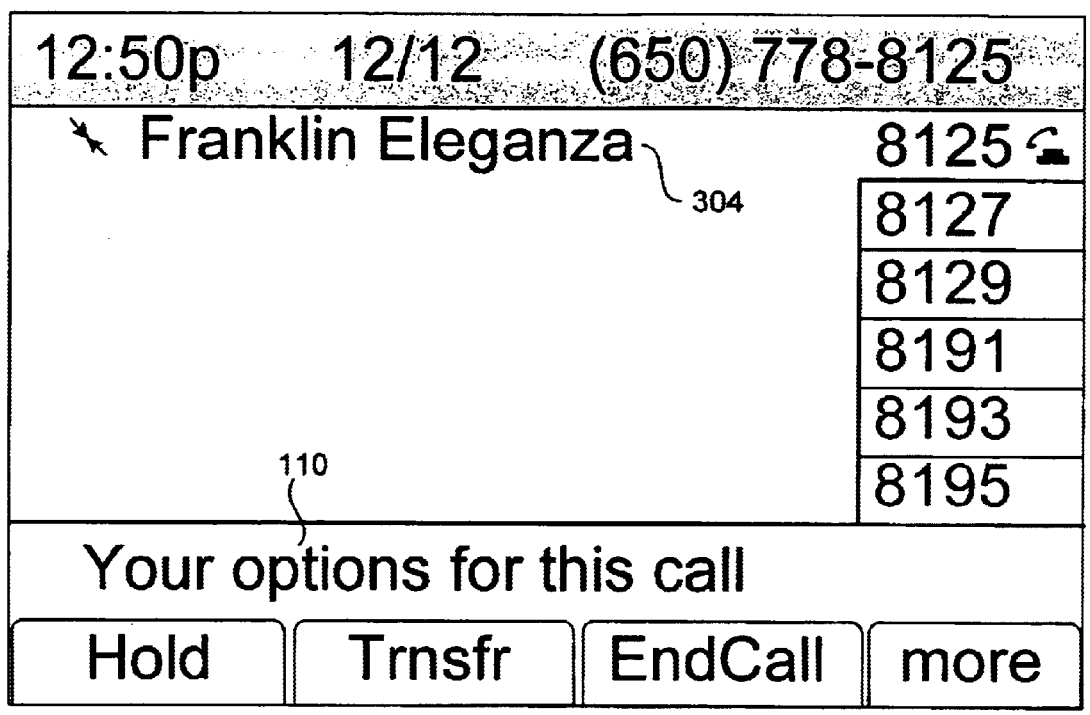

FIGS. 3A, 3B, and 3C are screen shots of a call window. Call windows provide more detailed information related to a call than the single line of information presented in the Overview state shown in FIG. 2. For example, a call window permits the display of information related to multiple simultaneous calls on the same primary directory number. In the described embodiment, when an incoming call is received by a set in the overview mode, a call window, such as plane 303 in FIG. 3A appears. For subsequent calls on a different directory number, the user selects that line (using a line key) to display a corresponding call window.

An icon 302 indicating the status of the phone call appears on the left representing the status of calls on a particular line. In addition, more complete information, such as the full name of the caller is displayed. Prompt/status plane 110, described initially in FIG. 1A, displays the status of the highlighted call (a particular call on the line) in line 304 containing the name "Franklin Eleganza." Another line 306 contains the name of an incoming call. Other examples of call windows are shown in FIGS. 3B and 3C. The screen shot in FIG. 3B shows a call window 308 containing a telephone number. In the command selection area is one available command for EndCall. FIG. 3C is a screen shot of a call window 309 with various options available to the user. The call window itself is similar to call window 303 shown in FIG. 3A, except the screen also has displayed some of the commands available to the user and are associated with or attached to the selected (highlighted) line or call: Hold, Trnsfr, and EndCall. In other preferred embodiments, the call windows described can contain additional or fewer commands and options than those described depending on user needs.

Figure 4A:
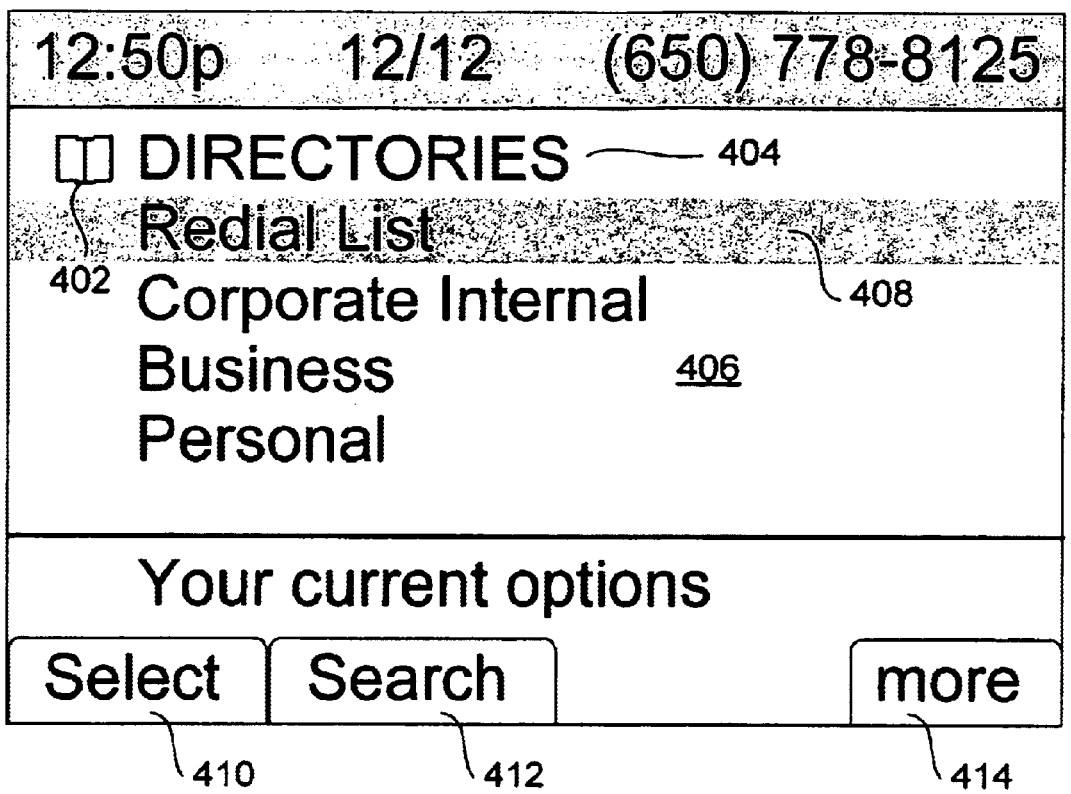

As mentioned above, there are various modes available to a user that can be chosen using buttons 118 in FIG. 1B. One mode available to a user is the Directories mode. In the described embodiment, this mode can be accessed by pressing the "Directory" button from key group 118 on the set equipped with the interactive design user interface of the present invention (the mode can be closed by pressing the same Directory button). FIG. 4A is a screen shot of an initial Directories mode screen. Each mode plane or window is identified by an icon 402 and a title 404 identifying the mode (e.g. Directories, Setvices, Settings, etc.) appearing in a line below the header plane. A mode plane 406 displays a list of categories from which a user can make a selection, highlighted in light gray, such as Redial List 408. Also shown are two commands or options: Select 410 and Search 412, either of which can be selected using a corresponding soft key. A user can also see other options by pressing the soft key under the "more" button 410 on the far right.

FIG. 4B is a screen shot of a Search configuration when chosen from the Directories mode in accordance with one embodiment of the present invention. A user input screen appears requesting one or more items of information from the user needed to perform a search for a name or number. In the described embodiment, the search criteria presented to the user are "First Name" "Last Name" "Number" and "Other." The user can enter information into one or more of these fields using line keys 114 and key pad 122 on the set. To begin the search the user presses the soft key corresponding to Begin and can cancel the operation by pressing the soft key corresponding to Cancel. If a particular entry matches the search criteria, it is displayed on the screen in a manner similar to that shown in FIG. 4C.

Figure 4C:
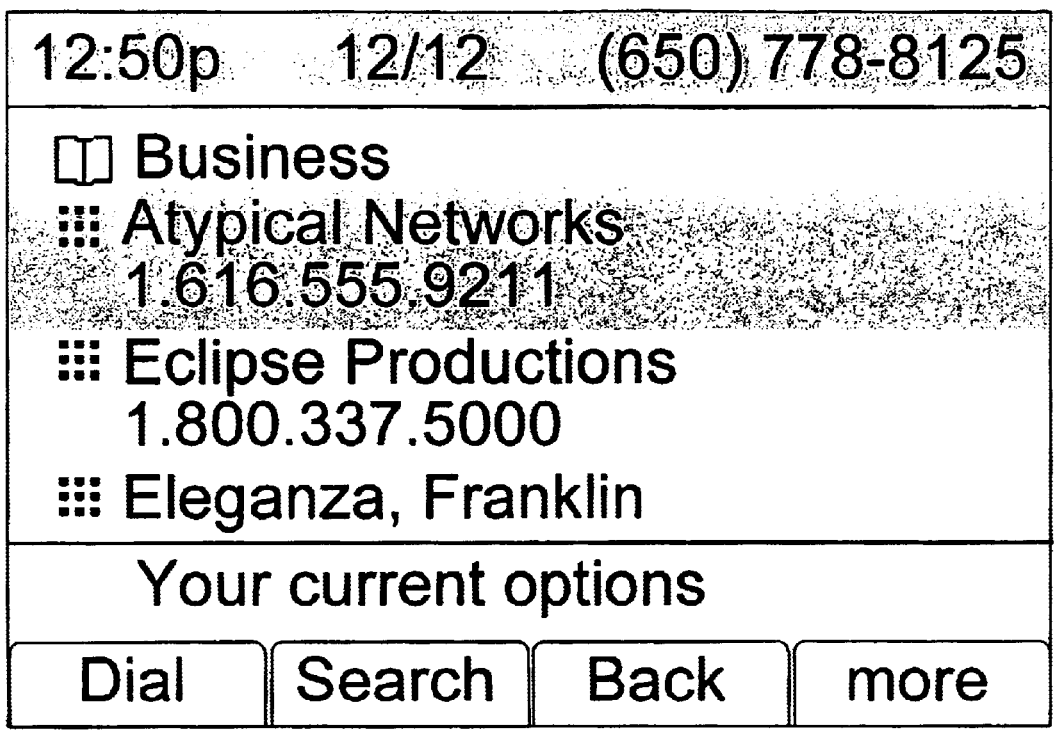

FIG. 4C is a screen shot of the Directories mode when a user selects a particular category. In this case, the user selects and opens the Business category from FIG. 4A. In this screen shot, a partial listing of the user's business contact names and numbers are displayed. In the described embodiment, the options available to the user are Dial, Search, and Back. The Dial option dials a highlighted entry, such as Atypical Networks highlighted in light gray. The Search option is identical to the Search feature shown in FIG. 4A. The Back option allows a user to go back to the Directory list shown in FIG. 4A.

Figure 4D:
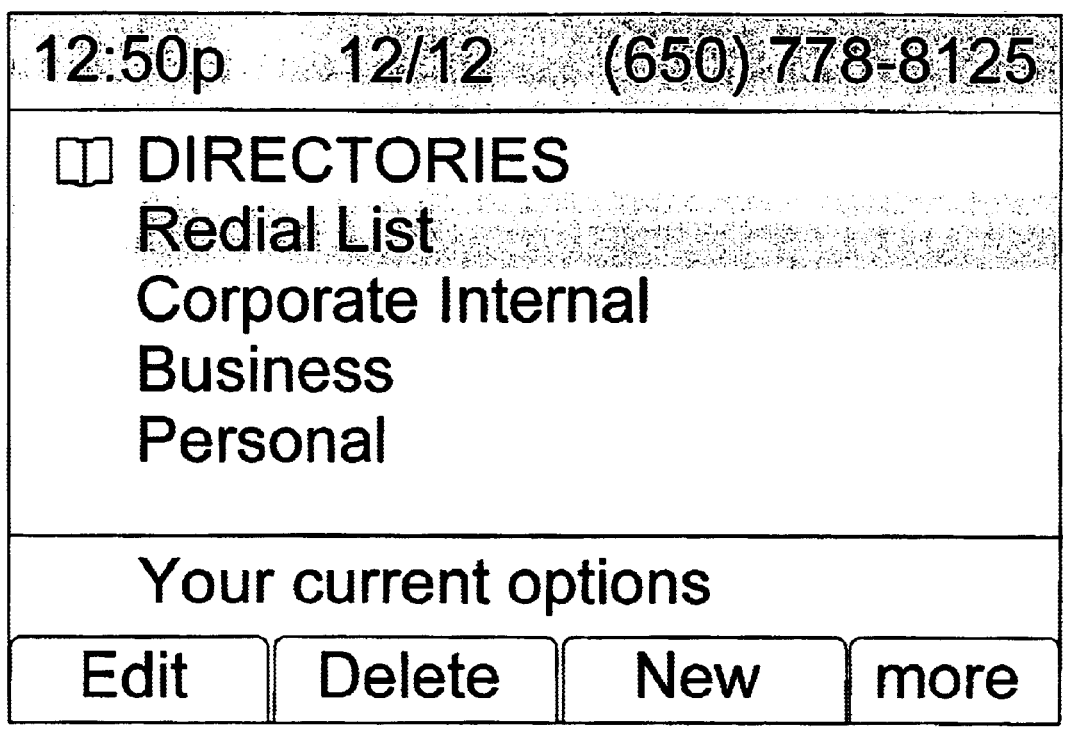

FIG. 4D is a screen shot of another configuration in the Directories mode. This configuration displays additional options to the user. In the described embodiment, they include Edit, Delete, and New. These options are displayed if the "more" option is selected in the previous menu shown in FIG. 4A and can be chosen from either the primary Directories screen showing categories of phone numbers or from a particular category listing such as shown in FIG. 4C. In a preferred embodiment, the Edit option allows a user to edit the name of a selected directory category, such as Redial List, or to edit the details of a selected contact, such as Atypical Networks, if in that screen. Similarly, in a preferred embodiment, Delete allows a user to delete an entire highlighted Directory category or delete a selected contact or name (along with any other related information, such as phone number). Finally, New allows a user to create a new Directory category or create a new name in a particular category if already in a particular category in a preferred embodiment.

Figure 4E:
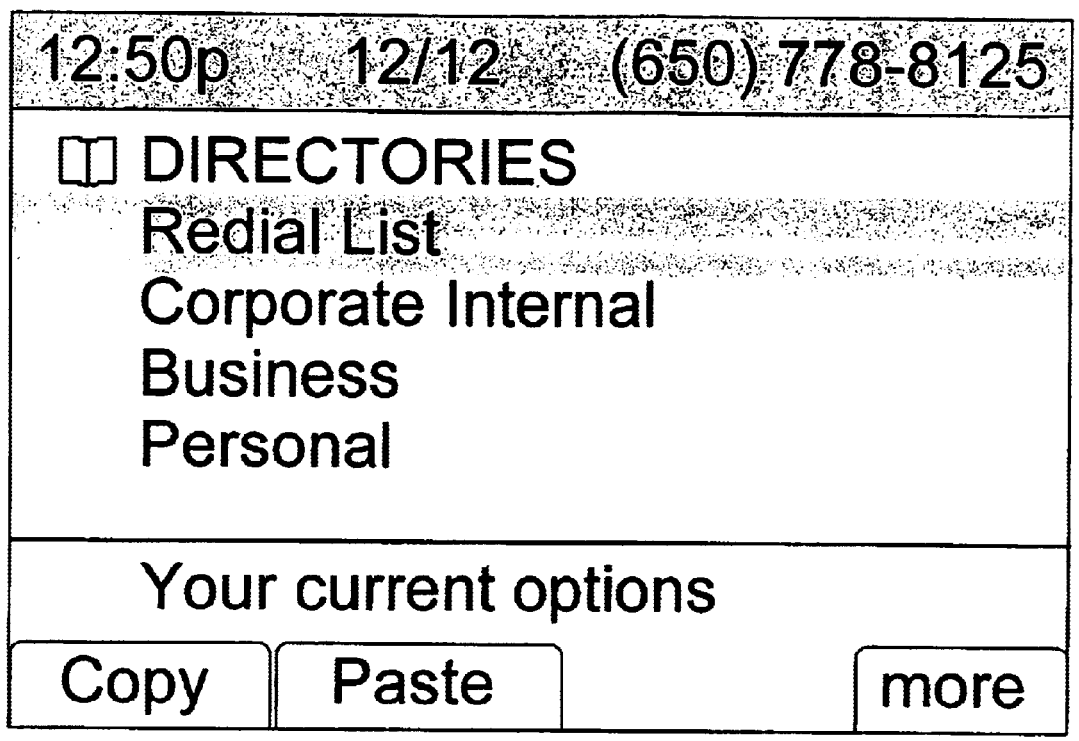

If the "more" option is selected, the user is presented with two remaining options in the described embodiment. If "more" is selected from the main Directories menu shown in FIG. 4A, a screen shot shown in FIG. 4E displaying the options Copy and Paste appears. If "more" is selected from a specific directory listing, such as shown in FIG. 4C, the same two options are displayed as shown in FIG. 4F. As with the Edit, Delete, and New commands, the functions of the Copy and Paste commands are the same in both settings but the data they operate on is different. By selecting Copy in FIG. 4E, a user can copy a highlighted directory into memory. By selecting Copy in FIG. 4F, a user can copy a highlighted name, such as Atypical Networks, into memory. By selecting Paste in FIG. 4E, a user can paste an appropriate item from memory into a highlighted directory. By selecting Paste in FIG. 4F, a user can paste from memory an appropriate item into the directory the user is currently in. It is possible to have some directories or folders that a user cannot or is not allowed to edit, such as a corporate directory. In such a case, the add, delete, and paste options are not available.

Figure 5A:
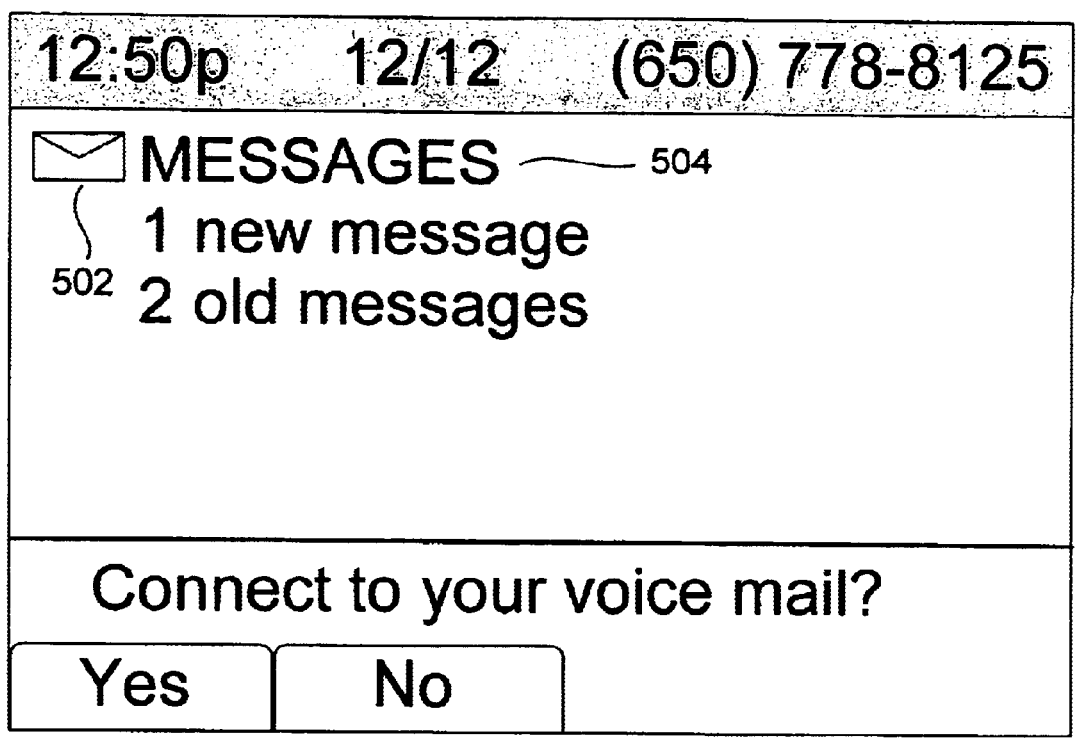
FIGS. 5A to 5C are screen shots of Messages windows configuration of the present invention.
Figure 5B:
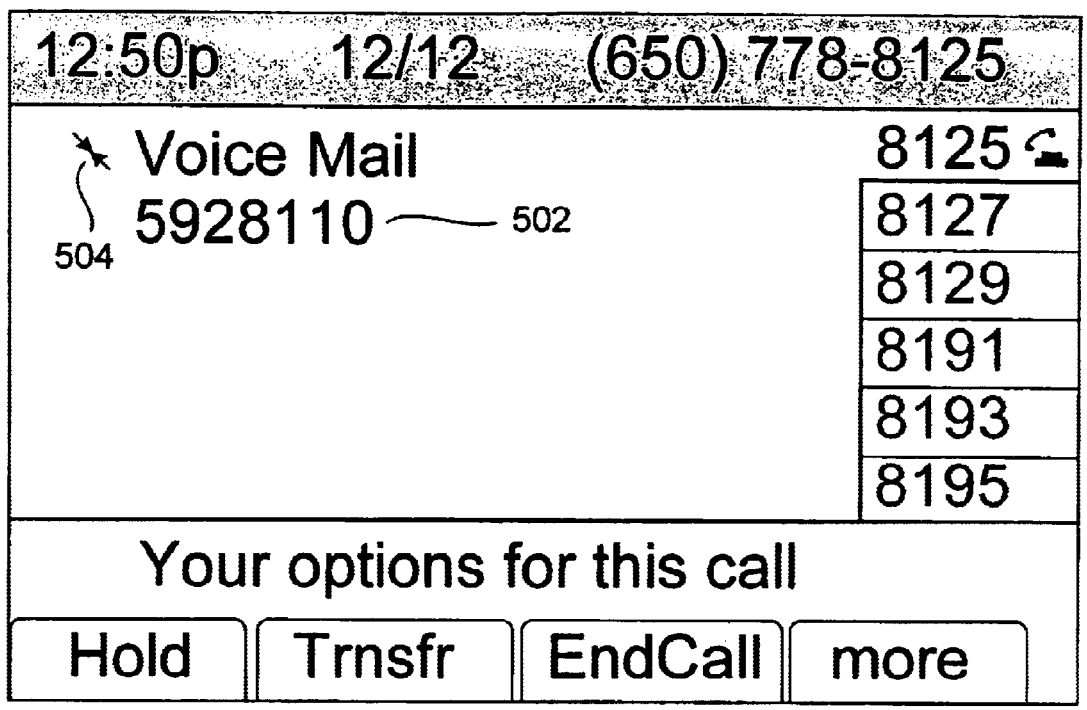

Another mode a user can access is the Messages mode by pressing the "Messages" button in key group 118 on the set. In the described embodiment, pressing the Messages button displays the screen shot shown in FIG. 5A. FIG. 5A is a screen shot of an initial Messages mode configuration in accordance with one embodiment of the present invention. As with the Directories mode, it shows an icon 502 and a Messages title 504. Underneath the title is a listing of the number of new messages and old messages. In the screen shot of FIG. 5A, the user has one new message and two old or played messages. In the status area the user has the option of accessing the user's voice mail. By selecting Yes, the user's voice mail number is dialed. FIG. 5B is a screen shot showing the activation of voice mail. Once voice mail is accessed, the user sees the voice mail number 502 being dialed, also shown graphically through icon 504. At this stage, in a preferred embodiment, the user can select from the command EndCall, in addition to commands Hold and Trnsfr (although these commands may not be applicable in all voice mail implementations), all applying specifically to the call being made to the user's voice mail.

Figure 5C:
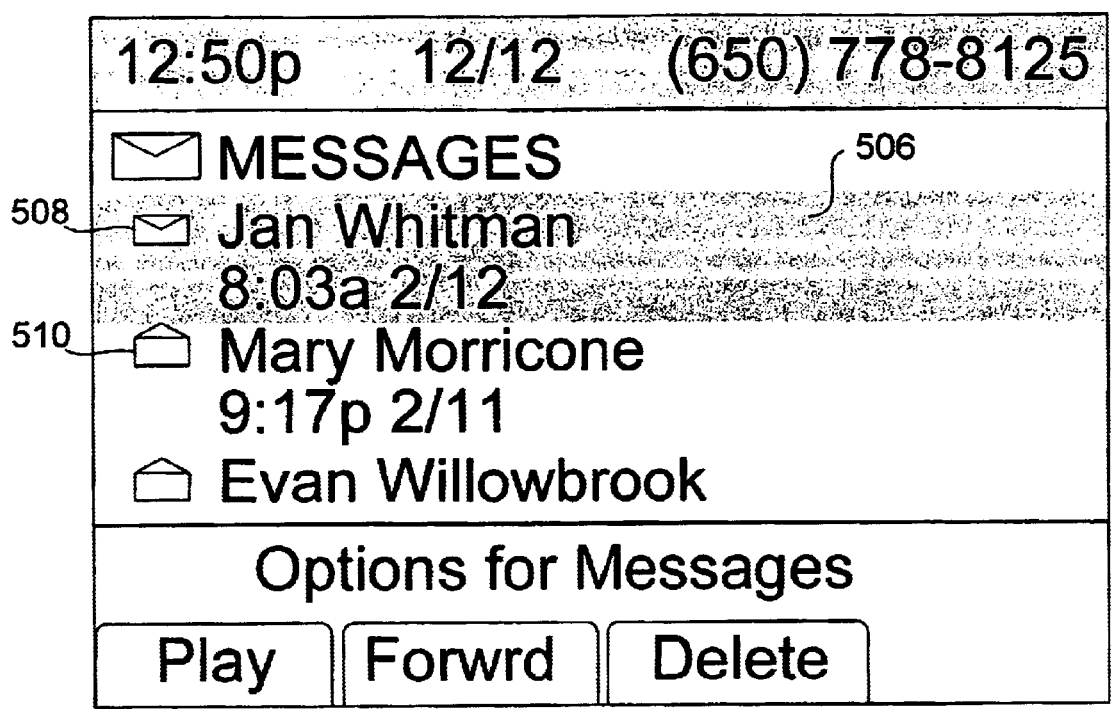

FIG. 5C is a screen shot of a partial listing of new and old messages. A highlighted entry 506 has an associated icon 508 indicating that the message is new or unopened, and displays the name of the caller and the time and day when the message was left. The other entries have an icon 510 indicating that the messages are old along with similar information about the message. In the described embodiment, the options available to the user for a selected message are Play, Forwrd, and Delete. The Play option allows a user to listen to the highlighted message. The Forwrd option allows a user to forward the message to another user. The Delete option allows the user to simply delete the message from the user's voice mailbox. In other preferred embodiments, fewer or additional commands can be displayed and other information about messages can be available to the user.

Figure 6A:
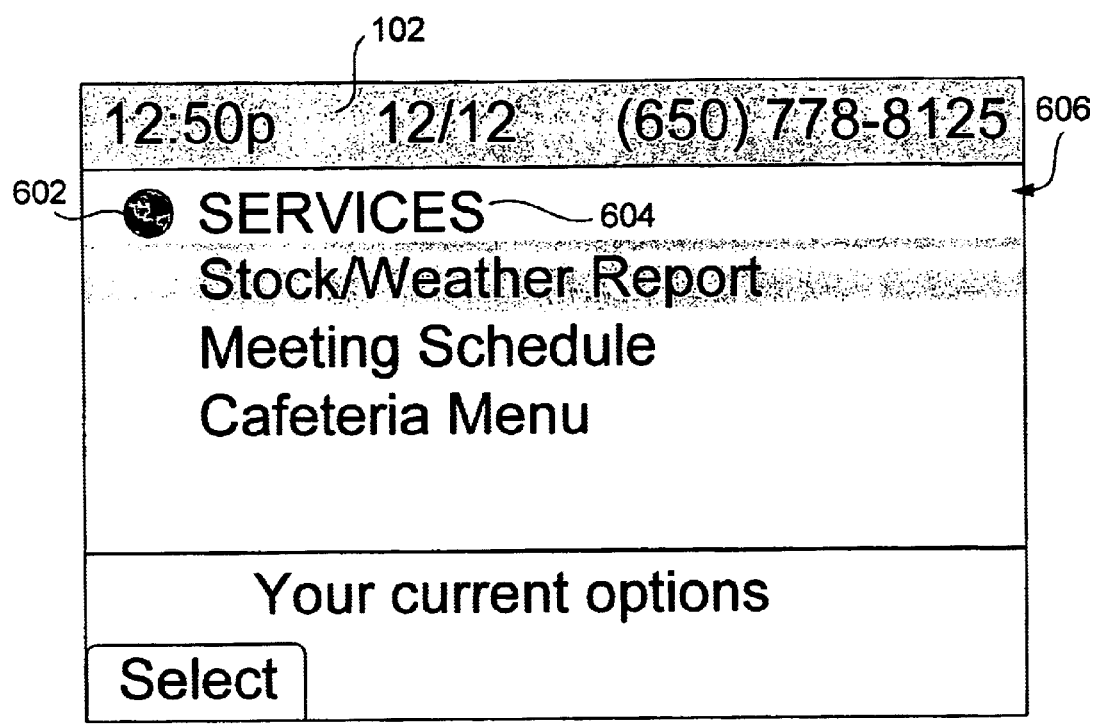
FIGS. 6A and 6B are screen shots of Services window configurations of the present invention.

FIG. 6A is a screen shot of an initial Services window configuration in accordance with one embodiment of the present invention. As with all screen shots described above, at the top of the screen is a header plane 102 indicating the time, date, and the primary direct line assigned to the set. In addition to this information, the Services mode provides the user with access to various non-telephonic information. As with the modes described above, the Services mode can be invoked by pressing the Services button on the set. The mode is indicated by a Services icon 602 and Services title 604 in row 606 below header row 102. Once in the Services mode, a user can exit by pressing the Services button. Underneath row 606 is a listing of categories of information to which the user has access. In the described embodiment there are three categories of information: Stock/Weather Report, Meeting Schedule, and Cafeteria Menu. In other preferred embodiments, there can be more or fewer categories of data depending on needs of the users being serviced and physical limitations of the set, for example network connections and bandwidth.

Figure 6B:
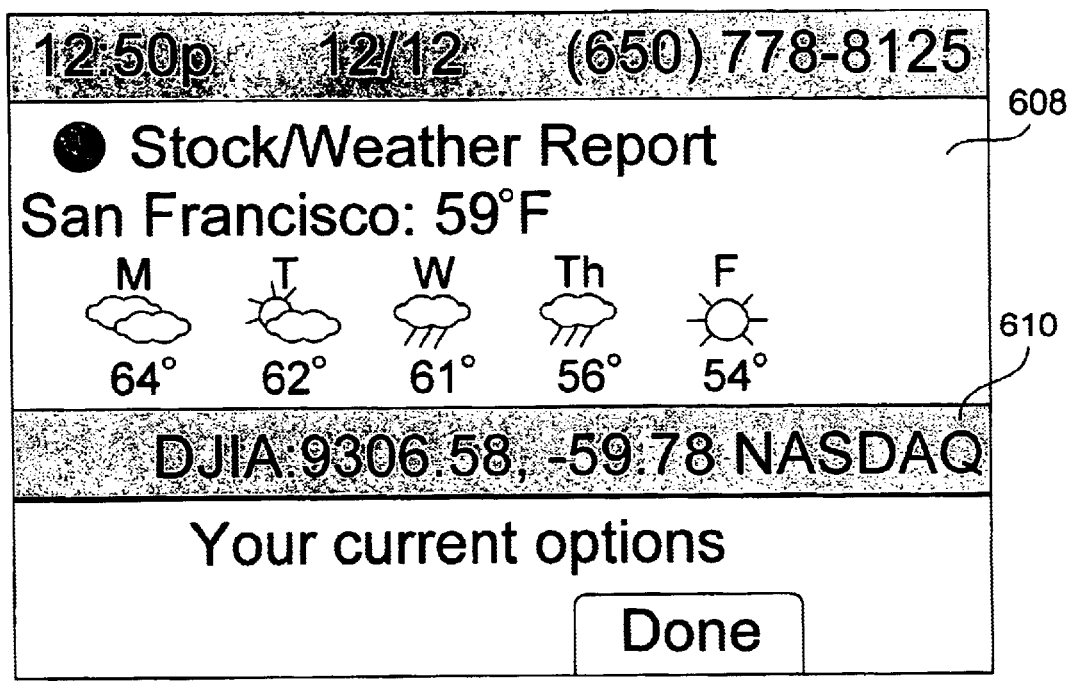

The user can highlight a particular category by pressing a corresponding line key and then select it by pressing the soft key directly below Select. In FIG. 6A the Stock/Weather Report category is highlighted. If selected, a screen shot shown in FIG. 6B appears. In the described embodiment window 608 displays the current temperature in a particular area, such as San Francisco and other weather information, in this case, a five-day forecast. Displayed in a row 610 is stock market information; in this case, the Dow Jones Industrial Average and, by scrolling to the right (using scroll keys 120), the NASDAQ index value. In other preferred embodiments, other types of weather and stock market information, such as the price of certain stocks, can be displayed if the necessary network connections and other requirements are met. In the described embodiment, other options are available and the user can return to the screen shot of FIG. 6A by pressing the soft key corresponding to "Done."

Figure 7A:
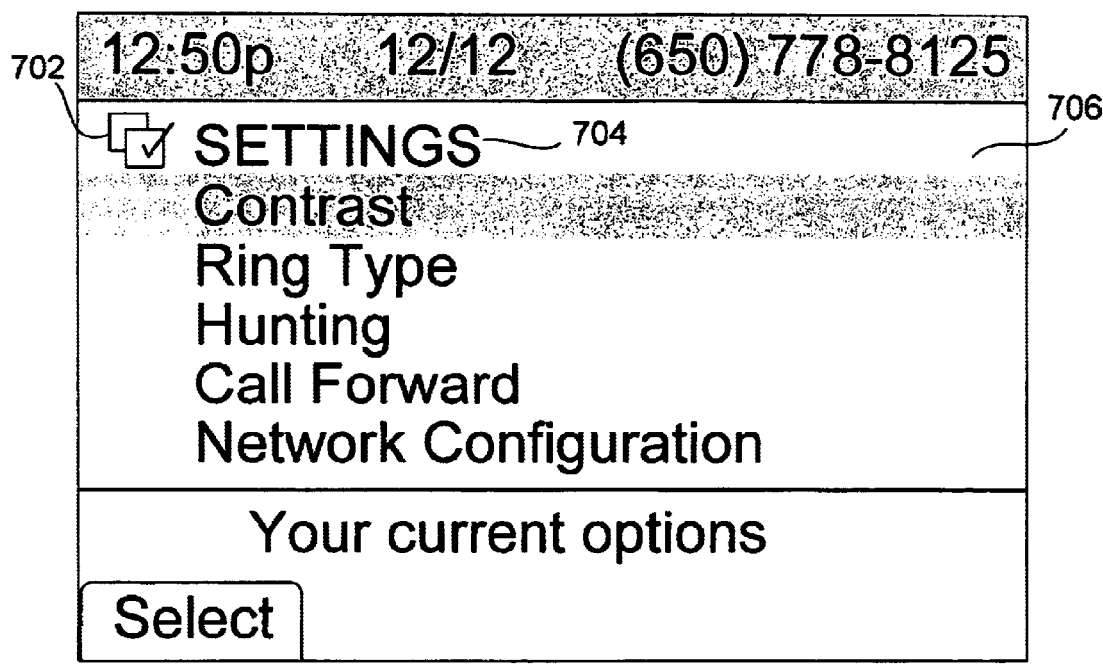
Figure 7B:
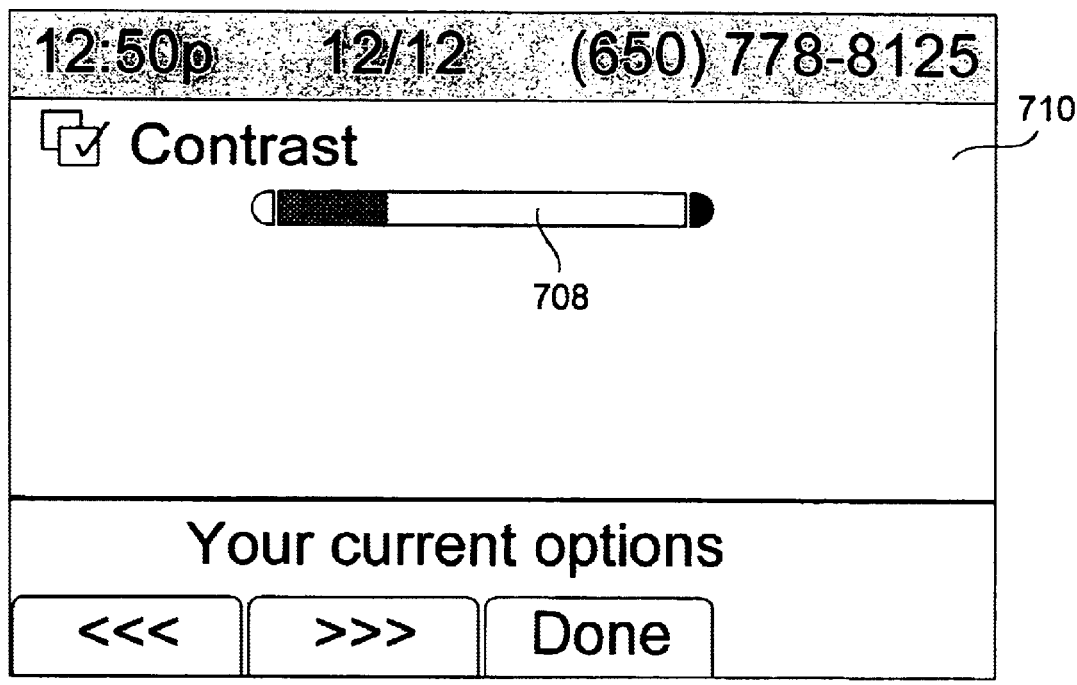

Another mode in the described embodiment is the Settings mode which can be invoked by pressing the "Settings" key in key group 118. FIG. 7A is a screen shot of an initial Settings mode configuration in accordance with one embodiment of the present invention. A Settings mode icon 702 and title 704 are displayed in row 706. Underneath row 706 is a list of features and options available to the user in the described embodiment. These include Contrast, Ring Type, Hunting, Call Forward, and Network Configuration. The user can highlight a feature, such as Contrast in FIG. 7A, and select it by pressing the soft key. FIG. 7B is a screen shot of a Contrast setting display in the described embodiment. A graphical contrast setting bar 708 is displayed in window 710. In the command selection area, the user can increase or decrease the contrast of the screen display (for all modes) or return to the initial Settings screen.

FIG. 7C is a screen shot of a Ring Type setting display in a preferred embodiment. The user can highlight and select a particular telephone ring type from a selection including High, Low, and Warble. In this setting, as with the Contrast setting and the settings described below, other options and selections can be provided depending on the needs of the users and capabilities of the set, telephone system, and network capabilities. The options shown are illustrative of a particular configuration. The configuration can be modified while remaining within the general concepts, modes of use, and menu hierarchies of the interactive design user interface of the present invention. For example, in another preferred embodiment, a longer list of ring types having a more descriptive names can be displayed to the user. Such different ring types may be implemented by .wav files.

Figure 7D:
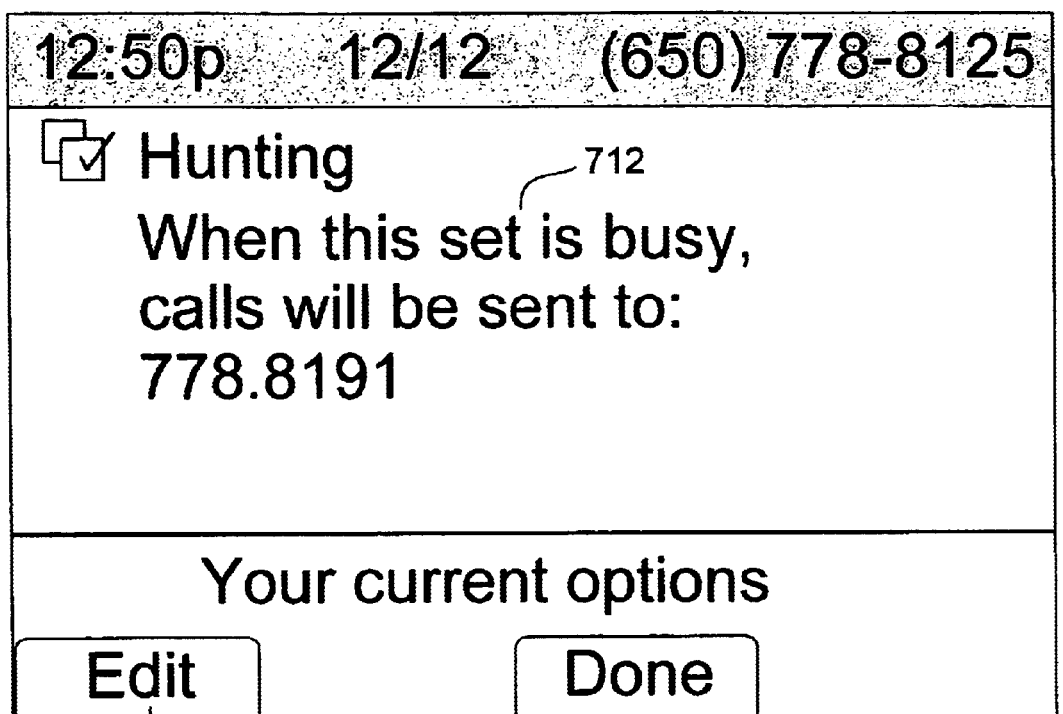
Figure 7E:
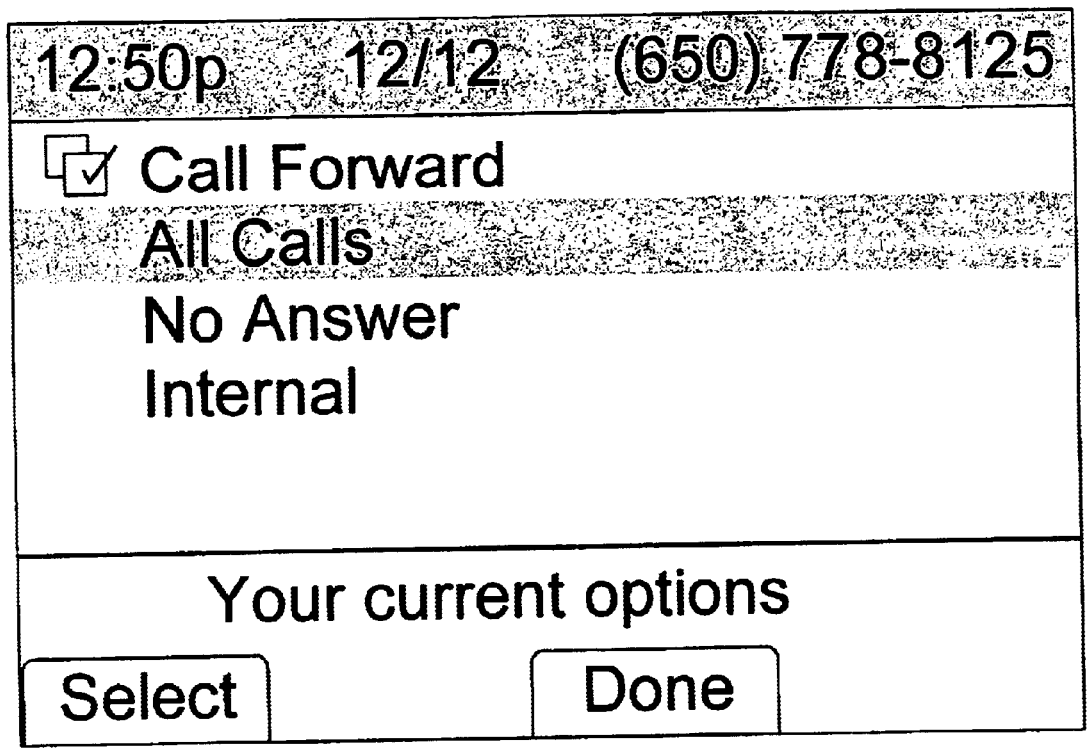
Figure 7F:
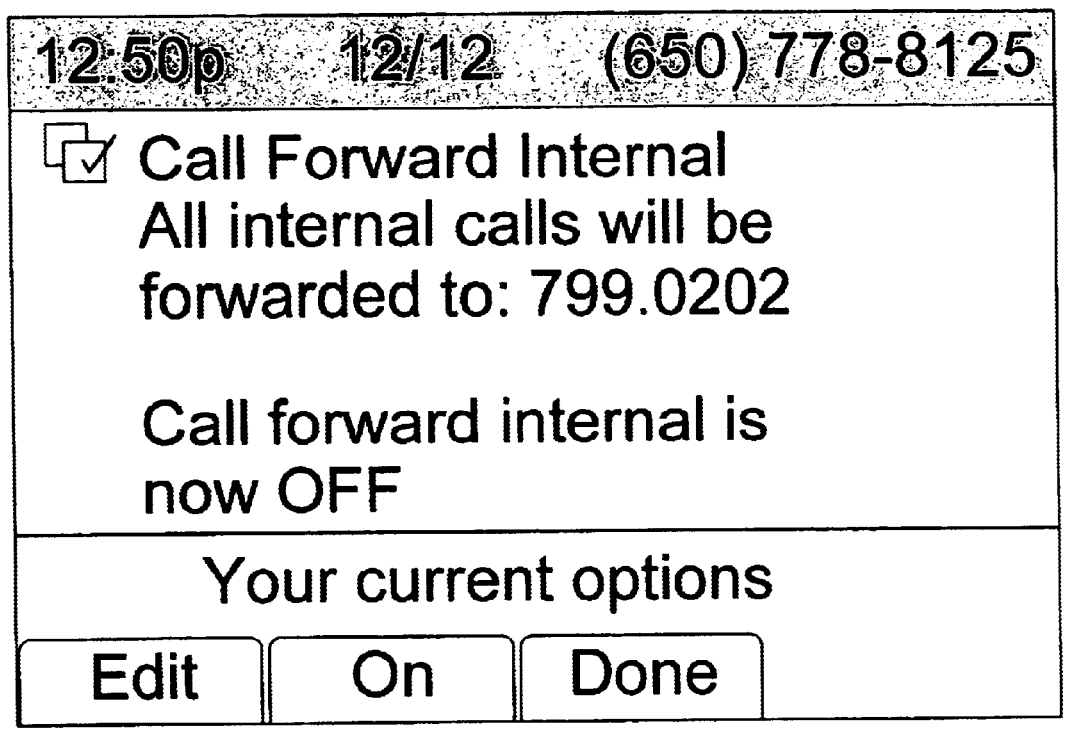
Figure 7G:
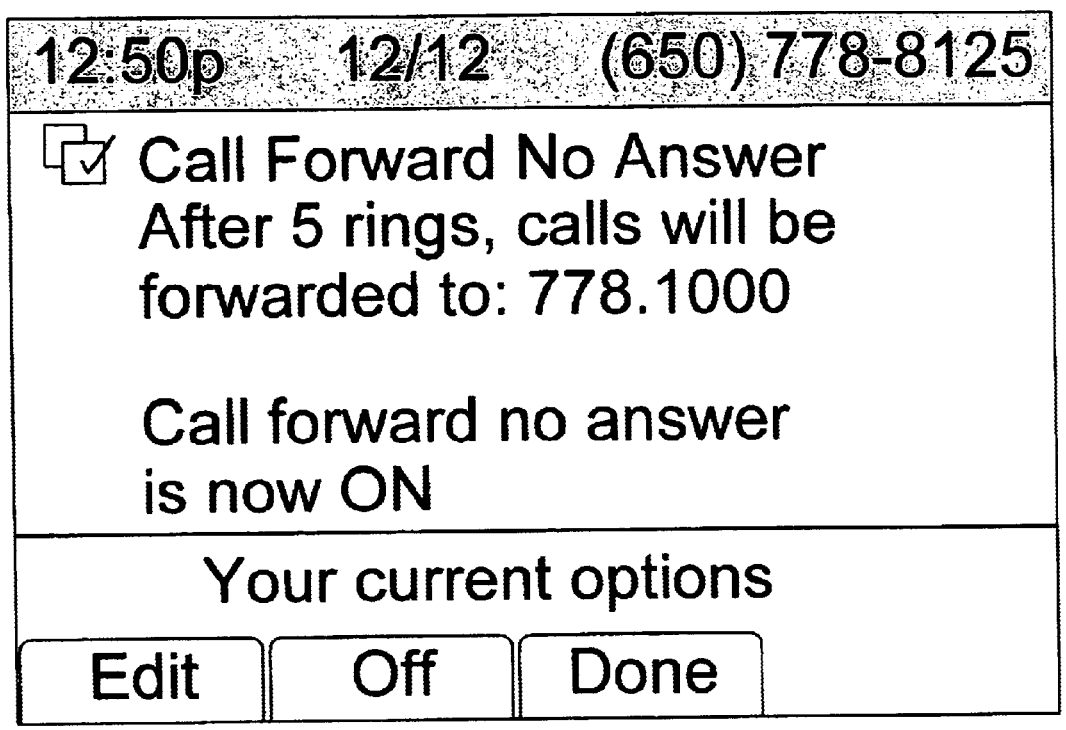
Figure 7H:
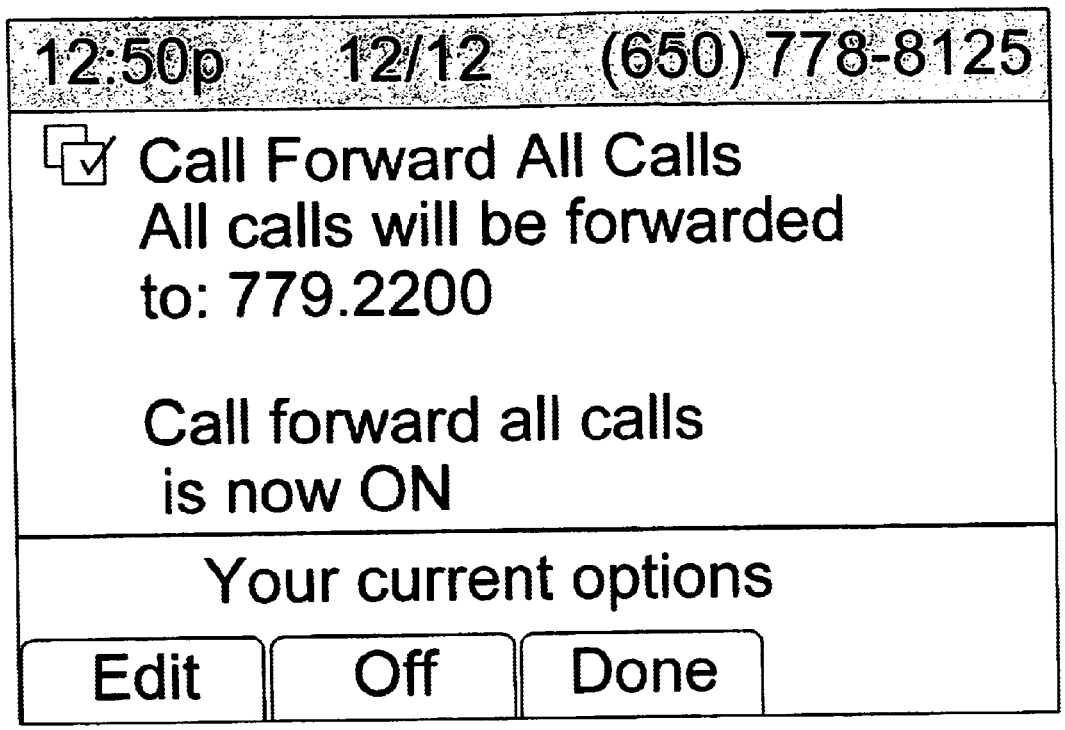

FIG. 7D is a screen shot of a Hunting feature display in a preferred embodiment. As explained in text 712, this feature of a preferred embodiment allows incoming calls to be redirected to a certain number when the set is busy. In other preferred embodiments, this feature and related features described below up to FIG. 7H, may not be desirable and, thus, not available to a typical user of the phone. Whether these features should be available to a user can be determined by a system administrator. It should be noted that these features allows a user to put his phone in a state in which he cannot receive any calls, typically an administrator function. In many cases this may not be desirable. However, when available, the feature can be set by editing the options, such as the phone number or extension to which the calls should be redirected, using Edit command 714. FIG. 7E is a screen shot of a Call Forward feature display in a preferred embodiment. Shown are three options: All Calls, No Answer, and Internal. A user can highlight and select an option using the line keys and soft keys as described above. FIGS. 7F, 7G, and 7H are screen shots of the three options. The screen shot in FIG. 7F is displayed if the Internal option is selected from FIG. 7E. It allows a user to forward all internal calls to a particular number. The user turns the feature On or Off, or can edit the option, using the command options and soft keys as described above. The screen shot in FIG. 7G is displayed if the No Answer option is chosen. This feature allows a user to forward calls to a particular number if an incoming call is not answered within a certain number of rings. As with the Internal option, the user can turn the option On or Off, or Edit the contents, such as the number of rings or the forwarding number, using the command options and soft keys. A third option in the described embodiment is the All Calls option, the screen shot for which is shown in FIG. 7H. This option allows a user to forward all calls (internal and external) to a particular number.

Figure 7I:
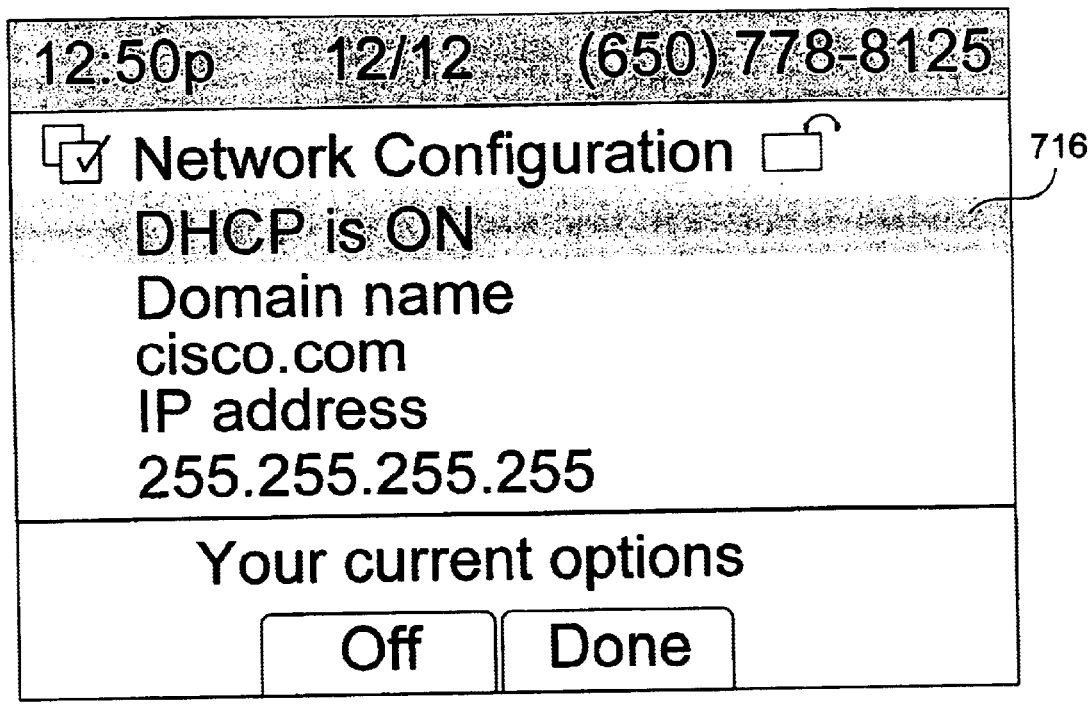

Another Settings option that can be selected from the screen in FIG. 7A is Network Configuration. FIG. 7I is a screen shot of a Network Configuration option display in the described embodiment. In a window 716 are displayed numerous informational items related to the network. These include the set's IP address and the company's Domain name. It also indicates whether the DHCP option is On or Off. In other preferred embodiments, other information related to the network can be included on additional pages if necessary.

Figure 8:
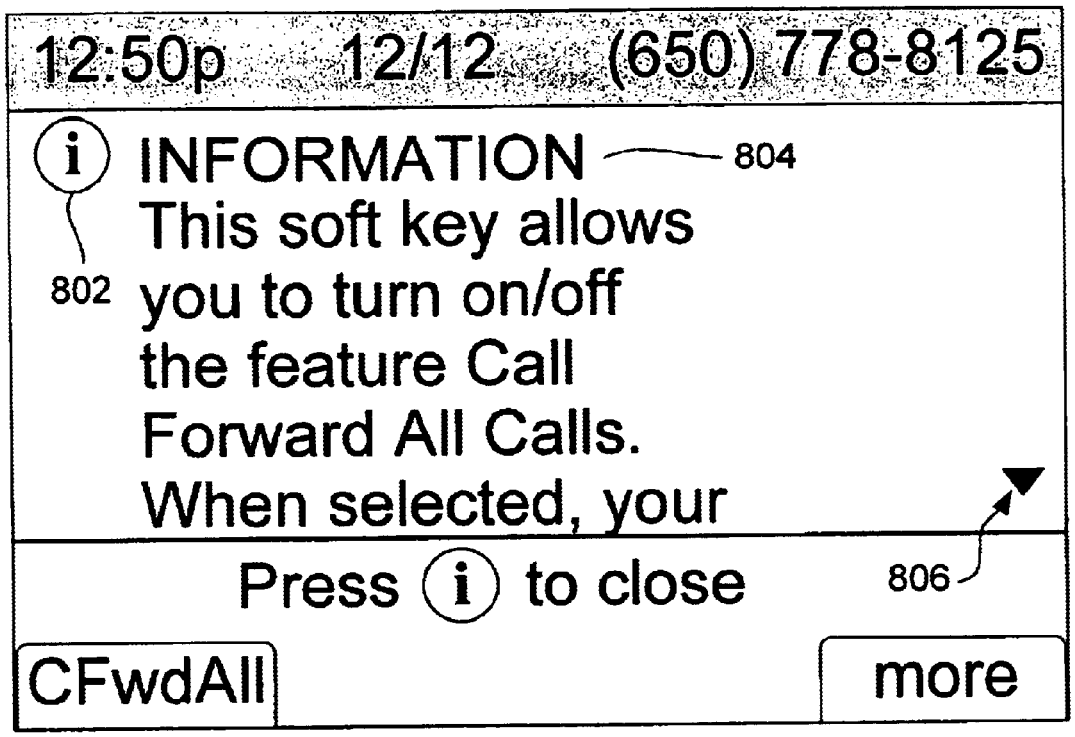
FIG. 8 is a screen shot of an Information window configuration of the present invention.

FIG. 8 is a screen shot of an Information window in accordance with one embodiment of the present invention. This mode provides context-specific information on a particular function, option, or command in a selected mode. First, the information window is activated at any time by pressing the "i" button in the center of key group 118 on the set followed by the key for the mode in which the user desires more information. This step can be skipped if the user is currently in the mode. The information key can then be used to explain a particular feature or command on demand. The example shown in FIG. 8 is information regarding the feature Call Forward All Calls. An icon 802 and Information title 804 indicate that the user is in Information mode. An arrowhead 806 denotes that there is more information on a subsequent page. The user can go to these pages by using scroll keys 120 on the set.

The screen shots described above represent the interactive user interface displayed on a monitor connected to or part of a telephone with the necessary network connections. The user interface allows a user to navigate through the various functions, options, and features available on PBX phones and phones equipped with voice-over-IP technology. The user interface is implemented using underlying software and data objects functioning in connection with or directly on the telephone. As described above, among the various actions a user can take, one is either pressing a context-sensitive soft key 116 to select an option or feature, or pressing a line key 114 as shown in FIG. 1B. Another action a user can take is pressing one of the mode keys 118 to access one of the operation modes or to access help information. Any of these actions cause the underlying software to retrieve and display certain information through the interactive user interface.

Figure 9:
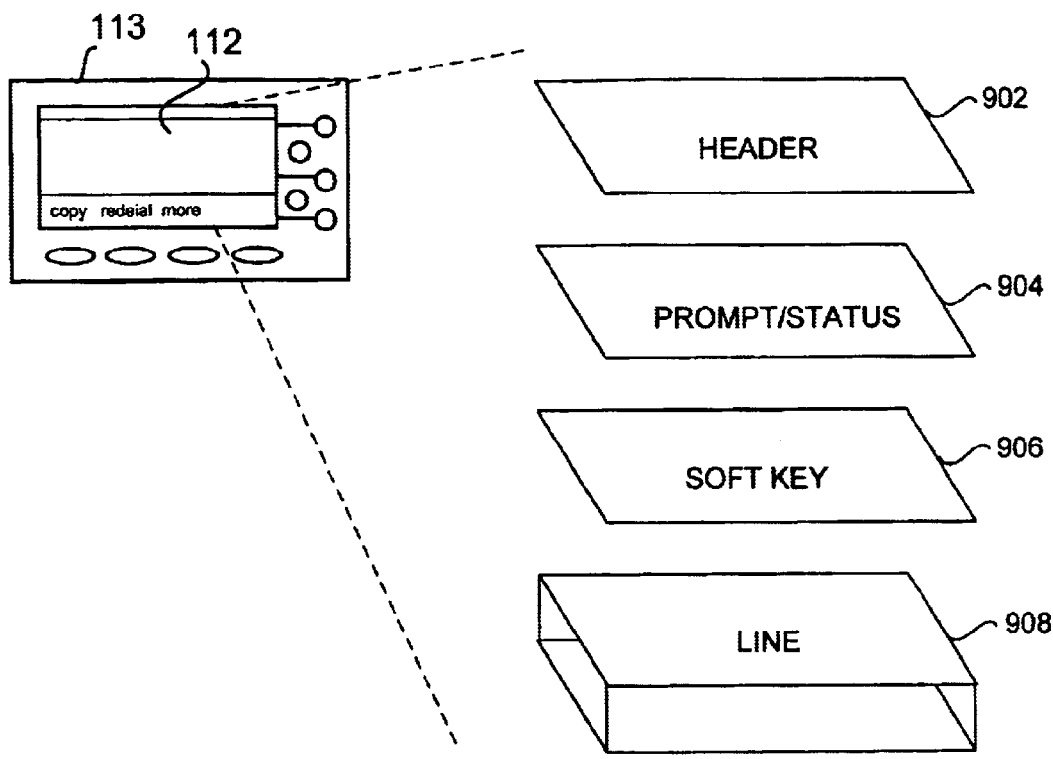
FIG. 9 is an illustration showing various display planes on the phone in accordance with one embodiment of the present invention.

FIG. 9 is an illustration showing various display planes used in the interactive user interface of the phone in accordance with one embodiment of the present invention. As described above, screen 112 of the user interface on the phone has numerous components or planes. In the described embodiment, these planes arc implemented logically as a hierarchy or series of layers, wherein each layer is an object (thus, a hierarchy of objects). These objects reside on and are under the control of the phone. In one preferred embodiment, the objects are implemented on an ASIC chip on the phone. A top layer 902 is header plane 102 which displays header information such as current time, date, and the primary extension number assigned to the phone. The header plane is always displayed in a preferred embodiment. It orients the user to the identity of the set. On the right is space for an icon denoting the current state of the set. Another layer 904 represents prompt/status plane 110 on the phone. The prompt/status plane updates the user as to what state the phone is in or prompts a statement relating to the soft keys. Any prompt messages that need to be displayed to prompt the user into some type of action overrides any status messages in the described embodiment. In the described embodiment, there is typically one prompt message for each mode and several status strings for each mode. When a line plane has focus (described in greater detail below), status and prompt messages displayed relate to a selected line or call. The content displayed in the prompt/status plane depends on which mode presently has focus. Below layer 904 is a layer 906 representing a soft key plane displaying labels for each of the soft keys which typically changes in different contexts. Layers 902, 904, and 906 are all one-dimensional in the described embodiment. At the bottom of the hierarchy is a three-dimensional layer 908 representing line plane 106 that displays information on the numerous phone lines available on the phone.

Figure 10:
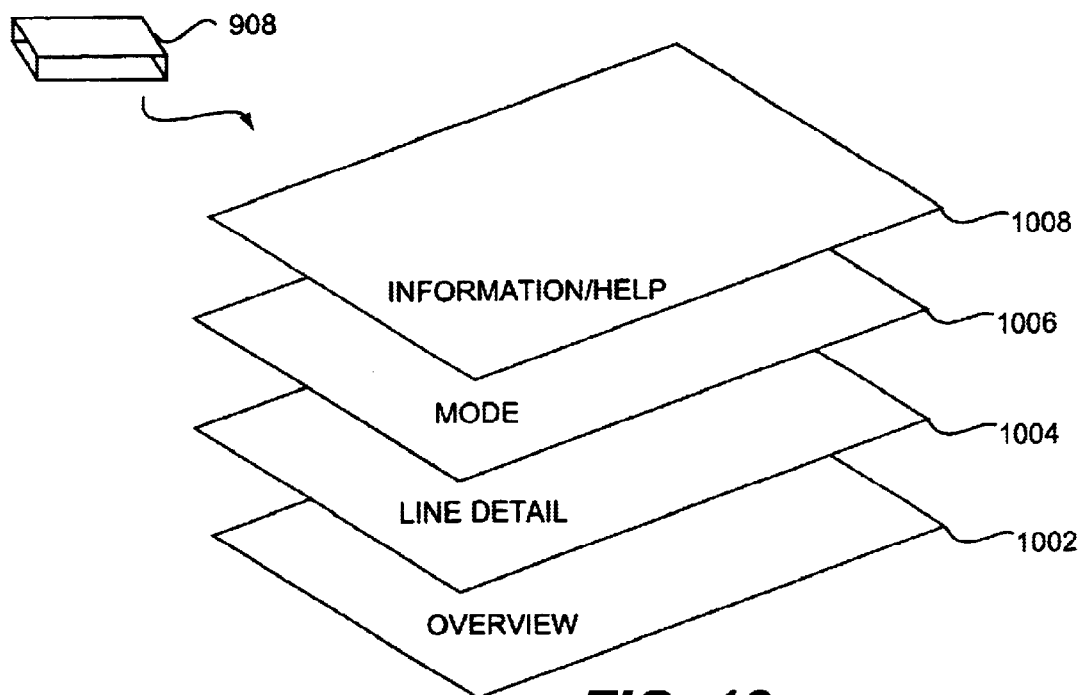
FIG. 10 is a detailed illustration of a line plane of the phone in accordance with one embodiment of the present invention.

FIG. 10 is a detailed illustration of layer 908 of FIG. 9 representing a line plane of the phone in accordance with one embodiment of the present invention. The line plane of the phone display area can be viewed as a three-dimensional plane having numerous levels or layers and resides on the phone in the described embodiment. At one end of the hierarchy is an overview plane 1002 showing an overview of all calls on the phone. Typically there are one or two active calls shown in overview plane 1002. At the next layer is a line detail plane 1004 which shows detailed data on one call on a particular line, such as the full name and/or phone number of the caller. At the next layer is a mode plane 1006. Mode plane 1006 displays data relevant to one of the four modes in the described embodiment. They include Settings, Directories, Services, and Messages. Data related to one of these modes is displayed in the mode plane when the user invokes a mode by pressing a button from buttons 118 of FIG. 1B on the phone. These modes share the same layer 1002 and only one can be active at a time.

At the other end of the line plane hierarchy is an information layer 1008 which overlays any of the other planes 1002, 1004 or 1006. Information/help plane 1008 overlaps all other planes when invoked by a user when the information button ("i") on the phone is pressed at any time. Information on a particular mode or call is available in any context regardless of which plane is active. Each of the planes or objects 1002, 1004, 1006, and 1008 has associated data and states, and can be invoked by using an active message to open the object. Upon receiving this type of message, the plane or object activates itself and causes itself to open. Once the object is active, it gets messages first and sends messages to a line handler object which resides on the phone. At this stage the open object has control of the soft keys, alphanumeric keys, the scroll keys, and other input means on the phone. When the plane or object is active or open, that object (i.e., mode) has focus in the phone. Once the object is deactivated, it no longer has focus of the phone.

Figure 11:
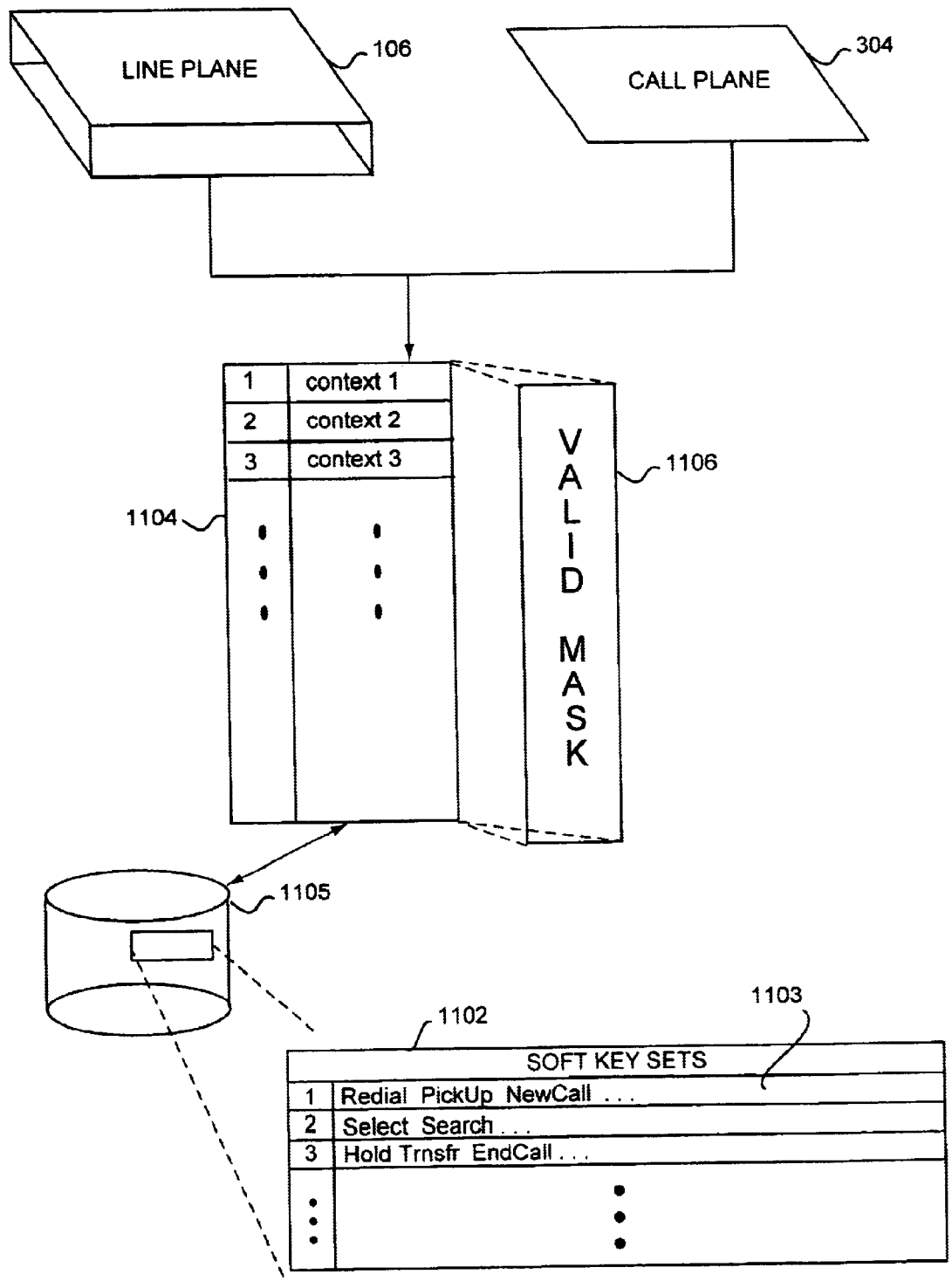
FIG. 11 is a block diagram showing a relationship among various objects and active sets of soft keys for use on a phone in accordance with one embodiment of the present invention.

FIG. 11 is a block diagram showing a relationship among various objects and active sets of soft keys for use on a phone in accordance with one embodiment of the present invention. The soft keys on the phone have context-specific functions. Thus, depending on the context, different text labels corresponding to the underlying functions are displayed above each soft key. For example the first soft key on the left side in FIG. 1C is Redial, but in another context, such as in FIG. 1D, it is CFwdAll (forward all calls). A context can have a set of options or choices for a user. Those options are made available through the use of soft keys. In the phone of the present invention, there are four soft key buttons. However, the options available to a user can exceed four by having one of the buttons correspond to "more" indicating that there are other options available.

Each active set of soft key labels is stored in storage area 1105 as a collection of soft key sets 1102. A particular set of soft key labels, such as set 1103, is retrieved via a soft key index 1104 using a number that points to the correct soft key set in storage area 1105. Connected to index 1104 is a valid mask 1106 which enables a "graying out" of certain options in an active set of soft keys which do not apply in a particular instance even though the soft key set may be correct in the larger context. In these cases, the options are still visible to the user even though they may not apply but are differentiated by being grayed out. In other embodiments, other visual indications can be used to differentiate these options. This is desirable over having a greater proliferation of soft key sets for every possible configuration in every context. It is also preferable from a user standpoint to have the same soft keys appear to be rooted in the same position when possible. This can be achieved by using the same soft key sets and simply invalidating specific options that do not apply in a particular context. If a user presses a soft key that is "grayed out" the action is ignored and no event is created. Soft key index 1104 and valid mask 1106 are invoked by either line plane 106 or a call plane 309. With call plane 309, remotely stored soft key sets may be accessed using soft key index 1104. These remote soft key sets can be downloaded from a call manager module located on a separate server.

Figure 12:
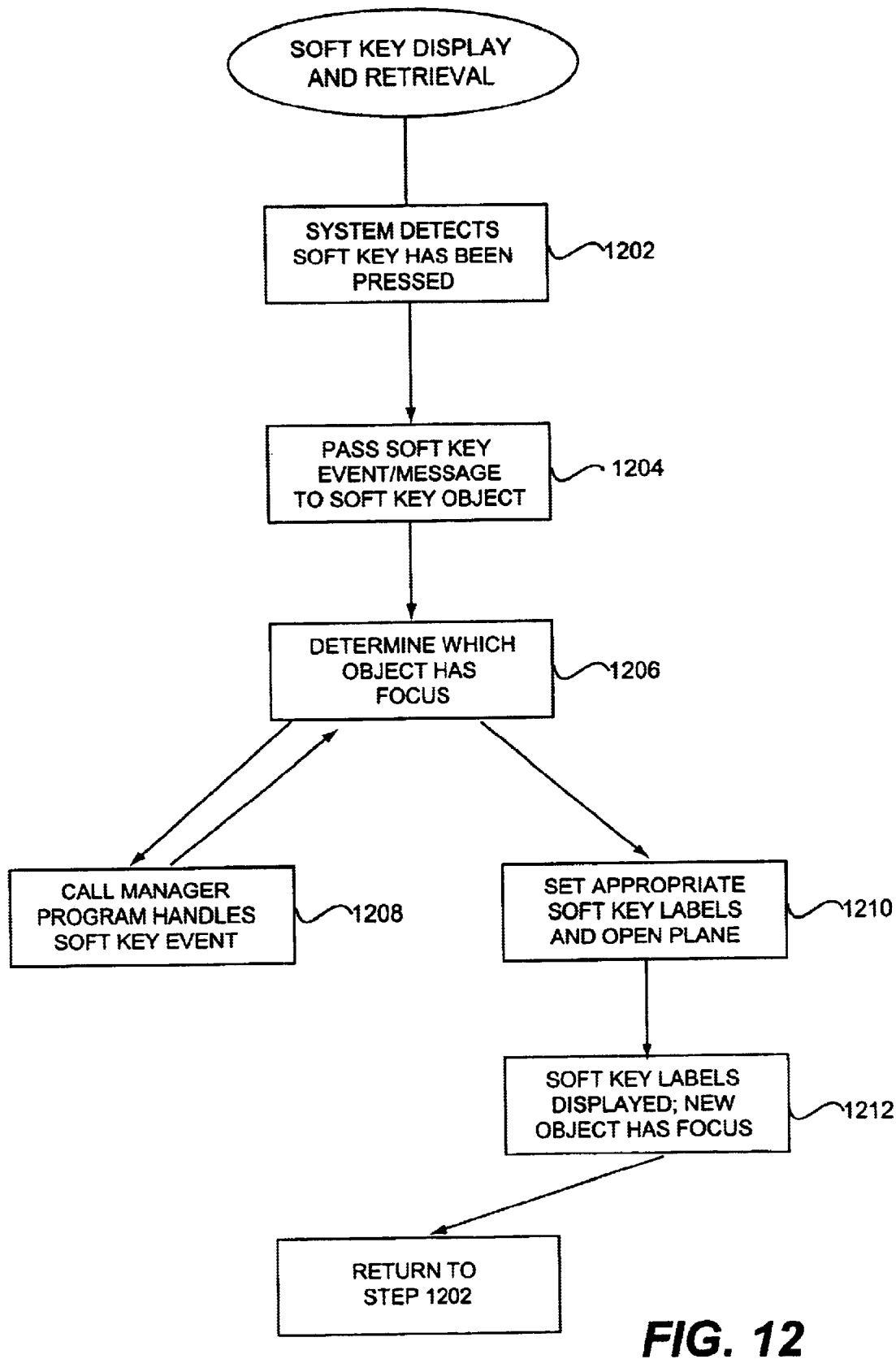
FIG. 12 is an overview flow diagram of a process for retrieving and displaying an appropriate soft key set on the phone in the described embodiment.

FIG. 12 is an overview flow diagram of a process for retrieving and displaying an appropriate soft key set on the phone in the described embodiment. At a step 1202 a line handler object detects that a particular soft key was pressed. This message is passed to the phone and a call manager program. At a step 1204, the line handler object passes responsibility for the message or action to a soft key object. The soft key object creates an event based on the key/option pressed by the user. By way of comparison, an event is created by the line handler object when a line key is pressed, the handset is picked up, or the speakerphone is activated.

As described earlier, the soft keys are context-sensitive in that the options corresponding to the soft keys change according to actions taken by the user. The soft key object is responsible for retrieving the correct soft key labels and displaying them as needed (e.g. some may be in reverse video or grayed out). At any given time, a particular object in the system has control or "focus" of the phone. Before the event can be processed by the soft key object, the system must determine which object presently has focus. This is done by the processing of the messages. The line handler object detects that a particular mode key has been pressed, such as the Messages key or the Settings key. As described above, the appropriate mode or object then has focus by being sent an active message and being opened. In the described embodiment, this is implemented by using a database variable in a database indicating which object has focus. The variable is an array index which points to a mode object, active line, or line handler object. This is done at a step 1206.

If the line plane is active, a call manager presently has focus. The call manager has focus when none of the other planes or objects have focus. In the described embodiment, the other objects are Messages, Directory, Settings, Services, and Information. If the call manager processes the soft key event, control goes to a step 1208 where a call manager program, typically located on an external server, such as a Windows NT server, handles the event. The call manager then sends a stimulus message to the line handler object. This stimulus message causes the phone to display a call plane, change the soft keys, or create a dial tone if needed.

If any of the five other objects or modes have focus, control goes to a step 1210. If the user has any of the five services (including the Help feature) active and a call comes in, the call manager located on an external server still contacts the line handler object. This occurs because a user still typically wants the phone to ring when a call comes in. At step 1210 the system retrieves the appropriate soft key label set and overlays the appropriate plane in the line plane area of the display. In the described embodiment, when the line plane changes, a "wiper" comes across the display area. During this animation, the soft keys are grayed out (for typically ¼ to ½ second) so that the user cannot use those keys. When the plane is displayed and the animation is complete, the key labels are displayed in an active state. This prevents invalid events from occurring from having a user press soft keys before the system is ready to process the event.

At a step 1212, the new object (one of Messages, Directory, Services, and Settings, or Information) has focus and the appropriate soft key labels are displayed. Thus, soft keys are changed by local events or by a call manager program and can change at anytime. However, only the object having focus can change the soft keys labels. Control then returns to step 1202 where the system is ready to detect another soft key event by the user.

When the call manager sends a stimulus message to the line handler object, as described in step 1208, such as when a call is being made or received, one of numerous line handler object messages is activated. Below is a list of the line handler object messages, a description of each one, and the typical parameters needed by each one.

Call Information

The call manager ("CM") sends a call information message to the line handler object when a new call lands on a Directory Number Line. The parameters include the Calling Party, Called Party and the Original Called Party. The Original Called party information will only be provided for calls that have been forwarded. The Line Instance number and the Call Reference ID are sent so the Line Handler object knows which Line to place a call on. A call type indicator is given in order to distinguish what type of call is being presented.

| Parameter | Description |
| --- | --- |
| Calling Party Number | The directory number of the calling party |
| Calling Party Name | The name of the calling party. This field is optional. |
| Called Party Number | The directory number of the called party. |
| Called Party Name | The name of the called party. This field is optional. |
| Original Called Party Number | The directory number of the called party. This field is only valid on forwarded calls. |
| Original Calling Party Name | The name of the called party. This field is optional and is only valid on forwarded calls. |
| Line Instance Number | This line indicates which DN line that this call is on. |
| Call Reference ID | This is the Call Reference Number for the call, it is used to differentiate between multiple calls and a DN line. |
| Call Type | This distinguishes the type of call, choices are (INBOUND, OUTBOUND, and FORWARD). |

Call State

The CM sends this message when an existing active call changes state. Examples of events that cause call state changes are far end answering, near end hang up, and the hold button being pressed. The phone does not process call states locally, but rather uses the call state information to determine what to display in the line plane and call display plane. All active calls must receive a CLEAR call state message when the call clears, which causes the call to be removed from the display.

| Parameter | Description |
| --- | --- |
| Call State | This indicates the current state of the call, choices are (RING IN, RING OUT, BUSY, CONGESTIONS, INVALID NUMBER, TALK, HOLD, and CLEAR). |
| Call Reference ID | This is the call Reference number for the call, it is used to differentiate between multiple calls and a DN line. |

Call Select Request

The CM sends this message to the line handler object when it needs to know which call in the line plane the user has selected for functions such as Pickup and Join. The phone responds with the Line Instance number and Call Reference ID for the selected call. This message has no parameters.

Download Soft Key Templates

The CM sends this message when it wants to create or change one or more soft key templates. Typically this is only done when the phone registers with CM, but it could be done at any time. If more than 32 soft keys exist, then multiple messages must be sent with the appropriate index.

| Parameter | Description |
| --- | --- |
| Soft Key Template Offset | This is the index into the Soft Key Template Array (1 to 256). |
| Soft Key Template Count | This is the number of soft keys contained in this message (1 to 32). |
| Soft Key i+0 Test | The text label for soft key number "index". |
| Soft Key i+0 Button Definition | The button event type that the phone originates when this soft key is pressed. |
| Soft Key i+1 Text | The test label for soft key number "index+1". |
| Soft Key 1+1 Button Definition | The button event type that the phone originates when this soft key is pressed. |
| *** | |
| Soft Key 1+31 Text | The test label for soft key number "index+31" |
| Soft Key i+31 Button Definition | The button event type that the phone originates when this soft key is pressed. |

Download Soft Key Sets

The CM sends this message when it wants to create or change one or more soft key sets. As described with respect to FIG. 11, a soft key set such as those in 1102 is a set of defined soft keys that are available at any given point in time. Typically these sets are only downloaded when the phone registers with CM, but this could be done at any time. Each soft key consists of 16 soft key templates. The first member of the array of indexes is associated with the first soft key position, and so on. Undefined soft key positions, which are indicated by a soft key template index of zero, are left blank on the display.

| Parameter | Description |
| --- | --- |
| Soft Key set Offset | This is the index into the Soft Key Set array (1 to 256) |
| Soft Key set Count | This is the number of the soft key sets contained in this message (1 to 32) |
| Soft Key Set 1 | Array of 16 soft key indexes for set 1 |
| Soft Key Set 2 | Array of 16 soft key indexes for set 2 |
| *** | |
| Soft Key Set 32 | Array of 16 soft key indexes for set 32 |

Select Soft Keys

The CM sends this message when the context of a plane has changed, such as when a new call is received. This causes the designated line plane to change its soft key mapping. Each active call within each call plane has a set of soft keys associated with it. This set has a number of soft keys, which may be defined, but may be invalid for the current call state. The plane specified by the instance number "0" indicates the line plane and 1 through 26 indicates one of the call planes.

| Parameter | Description |
| --- | --- |
| Instance Number | This indicates which Line/Call plane or which we are changing key mapping. |
| Call Reference Number | This indicates which call within the Call plane for which we are changing key mapping. |
| Soft Key Set Index | This is the index of the new Soft Key Set (0 to 255) |
| Valid Key Mask | This is a 16-bit mask of all the soft keys that are valid at the time that this message is sent. |

Display Status

This message causes a status string to be displayed in the prompt/status display plane 110. This status is displayed until it either times out per the passed time-out value, is cleared by the CM, or another prompt is sent. If the prompt string is active, this string is superseded. A user is able to check the status of multiple calls at the same time.

| Parameter | Description |
| --- | --- |
| Status String | This is null-terminated character string that is to be displayed. |
| Status Time-out | This determines the number of seconds that the prompt is to be displayed. A value of zero disables the time-out. |
| Instance Number | This indicates which Line/Call plane for which we are changing key mapping. |
| Call Reference Number | This indicates which call within the Call plane for which we are changing key mapping. |

Clear Status

This message causes the status string which is currently being displayed to be deactivated. If there is no active prompt string, then the prompt/status plane is blank. A user can check the status of multiple calls at the same time since each call has its own status string. This message has two parameters.

| Parameter | Description |
| --- | --- |
| Instance Number | This indicates which Line/Call plane for which we are changing key mapping. |
| Call Reference Number | This indicates which call within the Call plane for which we are changing key mapping. |

Display Prompt

This message causes a prompt to be displayed in the prompt/status display plane. This prompt is displayed until it either times out per the passed time-out value, is cleared by the CM, or another prompt is sent. This prompt string supersedes the active status string if there is one.

| Parameter | Description |
| --- | --- |
| Prompt String | This is null-terminated character string that is to be displayed. |
| Prompt Time-out | This determines the number of seconds that the prompt is to be displayed. A value of zero disables the time-out. |

Clear Prompt

This message causes the prompt string currently displayed to be deactivated. If there is a status message currently active, then it is (re)displayed in the prompt/status plane. If not, then the plane is blanked. This message has no parameters.

Active Call Plane

This message activates the call plane, which displays detailed information about calls that are active on the specified line key.

| Parameter | Description |
| --- | --- |
| Line Instance Number | Which DN line that is to be detailed in the call plane. |

Deactivate Call Plane

This message deactivates a call plane. It uncovers the line plane, which displays overview call information about the direct number lines to the right of the display. This message has no parameters.

The line handler object is supported by an event message referred to as a soft key event. The phone sends this event message to the line handler object when the user presses a soft key button. An instance number within the soft key button template indicates with which direct line number the event is associated. It also contains a reference number indicating with which item in the soft key plane the selected soft key is associated. In the described embodiment, this message is generic and can be used by other modes within the phone, such as the Directory or Messages modes.

As described above, associated with the line handler object are multiple sets of soft keys, presented to the user in the soft key plane based on a set of rules observed by the line handler object. The line handler object, as well as each active call in the call plane, has an index which points to the plane's currently active set of soft keys. Each soft key index also has a valid mask that indicates which keys within the set are valid in the current context. The Call Manager changes these indexes and masks during various phases of the calls that are active on the phone.

A call plane is activated in one of several ways. For example, a call plane is activated when the user presses a line key button when the user answers a ringing call using the handset, speaker phone, or the "Answer" soft key in the soft key plane. In other examples, the call manager activates a call plane when the user originates a new call with the handset, the speaker phone key, or the "New Call" soft key in the soft key plane. In another example, the phone itself determines when to activate a call plane. It will do this when the phone is idle and the phone rings, thereby saving the user the step of having to press a key when the phone rings and the user is not using the phone. When the user terminates a call, the call manager instructs the phone to de-activate the call plane. In the described embodiment, the call manager is not aware which call planes are open and in most cases is not signaled when the user presses the line key buttons. The one notable exception to this is when the user presses a line key to originate a new call.

Although the foregoing invention has been described in some detail for purposes of clarity of understanding, it will be apparent that certain changes and modifications may be practiced within the scope of the appended claims. Furthermore, it should be noted that there are alternative ways of displaying and allowing a user to navigate through the interactive user interface of the present invention. For example, the particular options and features available in the various modes can be presented in a different order to a user, i.e. have an alternative menu hierarchy, or fewer or additional features and options can be presented to a user without deviating from the general framework of the user interface. In another example, other network protocols can be used to deliver data to the telephone and, thus, the services and settings modes can display data items other than those shown. Accordingly, the present embodiments are to be considered as illustrative and not restrictive, and the invention is not to be limited to the details given herein, but may be modified within the scope and equivalents of the appended claims.

What is claimed is:

1. A telephone having an interactive user interface displayed on a monitor connected with the telephone, the user interface presenting an active mode of a plurality of modes of use on the telephone, the user interface comprising:
    a header segment for displaying a primary directory number assigned to the telephone;
    a lines segment for displaying context-sensitive data wherein the data can correspond to one or more first user-input mechanism;
    a command selection segment for displaying data related to options available to a user wherein the options are context-sensitive and can correspond to one or more second user-input mechanisms; and
    a status segment for displaying data related to one of the options displayed in the command selection segment and the context-sensitive data in the lines segment;
    wherein the interactive user interface allows a user to navigate through the plurality of modes, each one of the modes having a plurality of options, accessible on the telephone;
    wherein the context-sensitive data for each first user-input mechanism has a type that varies according to which mode is currently selected by the user;
    wherein the type can vary between a phone number and a message;
    wherein in at least one of the modes, the interactive interface allows the context-sensitive data displayed in the lines segment to contain a plurality of dialing data for placing a plurality of calls and at least one of the first user-input mechanisms corresponds to a single one of the dialing data; and
    wherein different ones of the first user-input mechanisms correspond to different ones of the plurality of dialing data displayed in the lines segment in one of the plurality of modes, and correspond to different ones of a plurality of network connection data displayed in the lines segment in another of the plurality of modes.

2. A telephone having a user interface as recited in claim 1 wherein the lines segment further includes a plurality of call segments, each one of the call segments displaying data related to a call.

3. A telephone having a user interface as recited in claim 1 wherein the first user-input mechanisms is a set of line buttons on the telephone.

4. A telephone having a user interface as recited in claim 1 wherein the second user-input mechanisms is a set of context-sensitive soft keys on the telephone.

5. A telephone having a user interface as recited in claim 1 wherein one of the plurality of modes is a directories mode.

6. A telephone having a user interface as recited in claim 5 wherein the directories mode further comprises a search segment wherein a search can be performed using a plurality of search criteria and a plurality of search categories.

7. A telephone having a user interface as recited in claim 5 wherein the directories mode further comprises a dial option, a search option, an edit function, a delete function, an add function, a copy features and a paste feature.

8. A telephone having a user interface as recited in claim 1 wherein one of the plurality of modes is a messages mode.

9. A telephone having a user interface as recited in claim 8 wherein the messages mode further includes a display of old messages and new messages.

10. A telephone having a user interface as recited in claim 8 further comprising a hold option, a transfer option, and a terminate call function.

11. A telephone having a user interface as recited in claim 8 wherein the messages mode further includes a display of message information including caller name, call date, call time, and an icon indicating whether a message is new or old.

12. A telephone having a user interface as recited in claim 11 further including a play option, a forwarding option, and a delete option.

13. A telephone having a user interface as recited in claim 1 wherein one of the plurality of modes is a services mode.

14. A telephone having a user interface as recited in claim 13 wherein the services mode further includes a display of non-telephonic information categories.

15. A telephone having a user interface as recited in claim 14 wherein the non-telephonic information categories include stock price information, weather information, and calendar information.

16. A telephone having a user interface as recited in claim 1 wherein one of the plurality of modes is a settings mode.

17. A telephone having a user interface as recited in claim 16 wherein the settings mode further includes a display of setting categories including contrast, ring type, hunting, call forward, and network configuration.

18. A telephone having a user interface as recited in claim 17 wherein the hunting category displays relevant information in text on the display monitor.

19. A telephone having a user interface as recited in claim 18 wherein the relevant text can be edited using an edit function.

20. A telephone having a user interface as recited in claim 17 wherein the call forward category further comprises an all calls feature, a no answer feature, and an internal feature.

21. A telephone having a user interface as recited in claim 20 wherein the all calls feature, the no answer feature, and the internal feature of the call forward category display relevant information in text on the display monitor.

22. A telephone having a user interface as recited in claim 17 wherein the network configuration setting category displays information relevant to a voice-over-IP network connection.

23. A telephone having a user interface as recited in claim 22 wherein the information relevant to a voice-over-IP network connection includes DHCP information, domain name information, and an IP address.

24. A telephone having a user interface as recited in claim 1 wherein one of the plurality of modes is an information mode.

25. A telephone having a user interface as recited in claim 24 wherein information on any mode, feature, and option is displayed in text on a display monitor.

26. A telephone having a user interface as recited in claim 25 wherein the information on any mode, feature, and option is context-sensitive and can be invoked in a plurality of contexts.

27. A telephone having a user interface as recited in claim 1 wherein each mode of the plurality of modes utilizes the header segment, the lines segment, the command selection segment, and the status segment.

28. A telephone having a plurality of user-input mechanisms and a display monitor capable of displaying a user interface for operating the telephone and accessing non-telephonic information, the user interface capable of displaying context-specific information in text form relating to a feature or option available through the telephone when a selected user-interface mechanism is activated, the use interface comprising a lines segment for displaying context-sensitive data, wherein the user interface allows the context-sensitive data displayed in the lines segment to contain a plurality of dialing data for placing a plurality of calls and at least one of the user-input mechanisms corresponds to a single one of the dialing data;

wherein the user-input mechanisms allow a user to select a plurality of modes, each one of the modes having a plurality of options, accessible on the telephone;

wherein the context-sensitive data has a type that varies according to which mode is currently selected by the user;

wherein the type can vary between a phone number and a message; and wherein different ones of the user-input mechanism correspond to different ones of the plurality of dialing data displayed in the lines segment in one of the plurality of modes, and correspond to different ones of a plurality of network connection data displayed in the lines segment in another of the plurality of modes.

29. A telephone having a plurality of user-input mechanisms, an TCP/IP connection and a display monitor capable of displaying a user interface, the user interface having a network configuration menu in which information relating to the TCP/IP connection can be displayed, the user interface comprising a lines segment for displaying context-sensitive data, wherein the user interface allows the context-sensitive data displayed in the lines segment to contain a plurality of dialing data for placing a plurality of calls and at least one of the user-input mechanisms corresponds to a single one of the dialing data;

wherein the user-input mechanisms allow a user to select a plurality of modes, each one of the modes having a plurality of options, accessible on the telephone;

wherein the context-sensitive data has a type that varies according to which mode is currently selected by the user;

wherein the type can vary between a phone number and a message; and wherein different ones of the user-input mechanisms correspond to different ones of the plurality of dialing data displayed in the lines segment in one of the plurality of modes, and correspond to different ones of a plurality of network connection data displayed in the lines segment in another of the plurality of modes.

30. A telephone as recited in claim 29 wherein the network configuration menu in which information relating to the TCP/IP connection can be displayed further comprises information relating to a DHCP connection.

31. A telephone having one or more user-input mechanisms and a display monitor capable of displaying non-telephonic information, the telephone having a TCP/IP connection with a plurality of external sources, each one of the external sources providing a particular type of information to be displayed on the display monitor, the telephone comprising a user interface having a lines segment for displaying context-sensitive data, wherein the user interface allows the context-sensitive data displayed in the lines segment to contain a plurality of dialing data for placing a plurality of calls and at least one of the user-input mechanisms corresponds to a single one of the dialing data;

wherein the user-input mechanisms allow a user to select a plurality of modes, each one of the modes having a plurality of options, accessible on the telephone;

wherein the context-sensitive data has a type that varies according to which mode is currently selected by the user;

wherein the type can vary between a phone number and a message; and wherein different ones of the user-input mechanisms correspond to different ones of the plurality of dialing data displayed in the lines segment in one of the plurality of modes, and correspond to different ones of a plurality of network connection data displayed in the lines segment in another of the plurality of modes.

32. A telephone having a display monitor as recited in claim 31 wherein one of the external sources provides stock market information.

33. A telephone having a display monitor as recited in claim 31 wherein one of the external sources provides weather information.

34. A telephone hang a display monitor as recited in claim 31 wherein one of the external sources provides information internal to a particular entity.

* * * * *